United States Patent
Yamada et al.

(10) Patent No.: US 8,387,044 B2
(45) Date of Patent: Feb. 26, 2013

(54) STORAGE SYSTEM AND VIRTUAL INTERFACE MANAGEMENT METHOD USING PHYSICAL INTERFACE IDENTIFIERS AND VIRTUAL INTERFACE IDENTIFIERS TO FACILITATE SETTING OF ASSIGNMENTS BETWEEN A HOST COMPUTER AND A STORAGE APPARATUS

(75) Inventors: Tomoya Yamada, Kawasaki (JP); Manabu Obana, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1068 days.

(21) Appl. No.: 12/359,588

(22) Filed: Jan. 26, 2009

(65) Prior Publication Data

US 2010/0131950 A1    May 27, 2010

(30) Foreign Application Priority Data

Nov. 27, 2008    (JP) .................................. 2008-302774

(51) Int. Cl.
*G06F 9/455* (2006.01)
(52) U.S. Cl. .......................................... 718/1; 709/238
(58) Field of Classification Search ....... 718/1; 709/238
See application file for complete search history.

(56) References Cited

U.S. PATENT DOCUMENTS

| | | | |
|---|---|---|---|
| 6,732,104 B1 * | 5/2004 | Weber | 1/1 |
| 6,996,741 B1 * | 2/2006 | Pittelkow et al. | 714/5.11 |
| 7,058,731 B2 * | 6/2006 | Kodama | 710/5 |
| 7,236,987 B1 * | 6/2007 | Faulkner et al. | 1/1 |
| 7,308,481 B2 | 12/2007 | Takamoto et al. | |
| 7,409,583 B2 * | 8/2008 | Yamamoto et al. | 714/6.1 |
| 7,711,789 B1 * | 5/2010 | Jnagal et al. | 709/213 |
| 7,757,279 B2 * | 7/2010 | Furukawa et al. | 726/13 |
| 7,849,265 B2 * | 12/2010 | Hara et al. | 711/114 |
| 2002/0194294 A1 * | 12/2002 | Blumenau et al. | 709/213 |
| 2003/0055933 A1 * | 3/2003 | Ishizaki et al. | 709/223 |
| 2003/0093439 A1 * | 5/2003 | Mogi et al. | 707/200 |
| 2003/0177330 A1 * | 9/2003 | Idei et al. | 711/202 |
| 2004/0111485 A1 * | 6/2004 | Mimatsu et al. | 709/213 |
| 2005/0055428 A1 | 3/2005 | Terai et al. | |
| 2006/0095640 A1 * | 5/2006 | Mimatsu et al. | 710/311 |
| 2006/0179170 A1 * | 8/2006 | Kodama | 710/8 |
| 2006/0230103 A1 | 10/2006 | Takamoto et al. | |
| 2007/0016681 A1 | 1/2007 | Suzuki et al. | |

(Continued)

FOREIGN PATENT DOCUMENTS

| | | |
|---|---|---|
| JP | 2006-293592 | 10/2006 |
| JP | 2007-26089 | 2/2007 |

(Continued)

OTHER PUBLICATIONS

Office Action issued in Japanese Patent Application No. 2008-302774 on Nov. 12, 2010.

*Primary Examiner* — Aimee Li
(74) *Attorney, Agent, or Firm* — Antonelli, Terry, Stout & Kraus, LLP.

(57) ABSTRACT

Identifiers of a plurality of physical HBAs disposed in a real host are grouped into a virtual HBA(s) for each work application executed in the real host. A storage device of a management server manages a virtual HBA ID which is an identifier of the virtual HBA and physical HBA IDs which are identifiers of the grouped physical HBAs, which are associated with each other. A display device of the management server displays information on a virtual host in which the virtual HBA is virtually disposed.

15 Claims, 35 Drawing Sheets

U.S. PATENT DOCUMENTS

| | | | |
|---|---|---|---|
| 2007/0220203 A1* | 9/2007 | Murase | 711/114 |
| 2007/0233838 A1 | 10/2007 | Takamoto et al. | |
| 2007/0271434 A1* | 11/2007 | Kawamura et al. | 711/165 |
| 2007/0276897 A1 | 11/2007 | Tameshige et al. | |
| 2008/0288620 A1* | 11/2008 | Goff et al. | 709/223 |
| 2009/0031222 A1 | 1/2009 | Nakamura et al. | |
| 2009/0287887 A1* | 11/2009 | Matsuki et al. | 711/154 |

FOREIGN PATENT DOCUMENTS

| | | |
|---|---|---|
| JP | 2007-272263 | 10/2007 |
| JP | 2007-310495 | 11/2007 |
| JP | 2007-316724 | 12/2007 |
| JP | 2007-317206 | 12/2007 |
| WO | WO 2007/108061 | 9/2007 |

* cited by examiner

FIG.5

171 Server virtual HBA management table

| Record number | Virtual HBA ID | Virtual host name | Physical HBA ID list | Application information | FC switch name |
|---|---|---|---|---|---|
| 1 | nn.nn.nn.nn.nn.nn.nn.nn | Virtual host A | List_A | App_A | SW A |
| 2 | oo.oo.oo.oo.oo.oo.oo.oo | Virtual host B | List_B | App_B | SW B |
| 3 | pp.pp.pp.pp.pp.pp.pp.pp | Virtual host C | List_C | App_C | SW C |
| ... | ... | ... | ... | ... | ... |

FIG.6

172,461 Path setting management table

| Record number | Storage name | Volume ID | Capacity | Port ID | Security physical HBA ID list |
|---|---|---|---|---|---|
| 1 | Storage A | VolumeA | XX GB | Port A | 11.11.11.11.11.11.11.11, ... |
| 2 | Storage A | VolumeB | YY GB | Port B | 33.33.33.33.33.33.33.33, ... |
| 4 | Storage B | VolumeA | XX TB | Port A | 22.22.22.22.22.22.22.22, ... |
| ... | ... | ... | ... | ... | ... |

FIG.7

173 Real host management table

| Record number | Host name | Host IP address | OS information | Application information |
|---|---|---|---|---|
| 1 | Host A | 192.×××.100.10 | OS_A | App_A |
| 2 | Host B | 192.×××.100.20 | OS_A | App_A |
| 3 | Host C | 192.×××.100.30 | OS_B | App_B |
| ... | ... | ... | ... | ... |

FIG.8

174 Real host HBA ID management table

| Record number | Host name | Physical HBA ID |
|---|---|---|
| 1 | Host A | 00.00.00.00.00.00.11.22 |
| 2 | Host A | 00.00.00.00.00.00.11.33 |
| 3 | Host B | 00.00.00.00.00.00.22.33 |
| ... | ... | ... |

FIG.9

175 Switch configuration management table

| Record number | FC switch name | FC switch IP address |
|---|---|---|
| 1 | SW A | 192.×××.50.10 |
| 2 | SW B | 192.×××.50.20 |
| 3 | SW C | 192.×××.50.30 |
| ... | ... | ... |

FIG.10

176 Port management table

| Record number | FC switch name | FC switch port name | FC switch port ID | Port destination ID |
|---|---|---|---|---|
| 1 | SW A | SW_Port A | Port 1 | 00.00.00.00.00.00.11.22 |
| 2 | SW A | SW_Port B | Port 2 | 00.00.00.00.00.00.11.33 |
| 3 | SW A | SW_Port C | Port 3 | 00..00.00.00.00.55.55.11 |
| ... | ... | ... | ... | ... |

FIG.11

351 Switch virtual HBA management table

| Record number | Physical HBA ID list | Virtual HBA ID | FC switch port ID |
|---|---|---|---|
| 1 | nn.nn.nn.nn.nn.nn.nn.nn | List_A | Port 1 |
| 2 | tt.tt.tt.tt.tt.tt.tt.tt. | List_F | Port 3 |
| 3 | vv.vv.vv.vv.vv.vv.vv.vv | List_G | Port 2 |
| ... | ... | ... | ... |

FIG.12

352 I/O management table

| Record number | Originating physical HBA ID | Storage apparatus port ID | Virtual HBA ID | Exchange ID |
|---|---|---|---|---|
| 1 | 00.00.00.00.00.00.11.22. | 00.00.00.00.00.55.55.11 | nn.nn.nn.nn.nn.nn.nn.nn | oxid_0001 |
| 2 | 00.00.00.00.00.00.11.33 | 00.00.00.00.00.55.55.11 | nn.nn.nn.nn.nn.nn.nn.nn | oxid_0102 |
| ... | ... | ... | ... | ... |

FIG.33

171a Virtual HBA management table

| Record number | Virtual HBA ID | Virtual host name | Application information |
|---|---|---|---|
| 1 | nn.nn.nn.nn.nn.nn.nn.nn | Virtual host A | App_A |
| 2 | oo.oo.oo.oo.oo.oo.oo.oo | Virtual host B | App_B |
| ... | ... | ... | ... |

Comparative Example

Comparative Example

STORAGE SYSTEM AND VIRTUAL INTERFACE MANAGEMENT METHOD USING PHYSICAL INTERFACE IDENTIFIERS AND VIRTUAL INTERFACE IDENTIFIERS TO FACILITATE SETTING OF ASSIGNMENTS BETWEEN A HOST COMPUTER AND A STORAGE APPARATUS

CROSS REFERENCE TO RELATED APPLICATIONS

This application claims the benefit of Japanese Patent Application No. 2008-302774 filed on Nov. 27, 2008, the disclosure of which is incorporated herein by reference.

BACKGROUND OF THE INVENTION

1. Field of the Invention

The present invention relates to a technique of a storage system and a virtual interface management method.

2. Description of the Related Art

In managing business host computers (which may also be referred to as host computers or hosts hereafter), a volume of a storage apparatus is required to be assigned to each of the hosts. One of the environments for assigning a volume to a storage apparatus for each host is a storage system in the SAN (Storage Area Network).

In the storage system in the SAN environment, a data transfer method called an FC (Fibre Channel) is used. In the SAN environment using the FC, an HBA (Host Bus Adapter) is used as a network adapter in a network between the host and the SUN.

Japanese Published Patent Application No.2007-310495 discloses a computing system in which a data can be moved by logical units in a configuration change in a computer system to which a storage virtualization technology is applied, while suppressing performance deterioration of the storage system.

In the conventional storage system in the SAN environment, settings of HBAs are necessary according the number of hosts. As the number of hosts increases along with usage of a larger-scaled storage system, the number of settings of HBAs also increases. In particular, if a plurality of hosts uses a single work application, the settings of HBAs are required to be performed repeated times to one storage apparatus. This causes problems such as an increase in the number of settings of man-hour and a complicated management in operating the system after the settings.

Additionally, if a change in a configuration of the SAN environment is necessary, such as an addition of a new host, settings of connection between a host and a storage apparatus, that is, settings of HBAs, are indispensable. However, the conventional system has a problem that a storage administrator needs to set HBAs each time a new host is added.

The present invention has been made in light of the background as described above and in an attempt to facilitate a setting of assignment between a host computer and a storage apparatus.

SUMMARY OF THE INVENTION

Physical interface identifiers of a plurality of physical interfaces disposed in a host computer are grouped into a virtual interface(s) by grouping information. A storage part manages a virtual interface ID which is an identifier of the virtual interface and physical HBA IDs which are identifiers of the grouped physical HBAs, which are associated with each other. A display part displays information on a virtual host in which the virtual interface is virtually disposed.

Other features and advantages of the present invention will become more apparent from the following detailed description of the invention, when taken in conjunction with the accompanying exemplary drawings.

BRIEF DESCRIPTION OF THE DRAWINGS

FIG. 5 is a diagram showing an example of a server virtual HBA management table according to the first embodiment.

FIG. 6 is a diagram showing an example of a path setting management table according to the first embodiment.

FIG. 7 is a diagram showing an example of a real host management table according to the first embodiment.

FIG. 8 is a diagram showing an example of a real host HBA ID management table according to the first embodiment.

FIG. 9 is a diagram showing an example of a switch configuration management table according to the first embodiment.

FIG. 10 is a diagram showing an example of a port management table according to the first embodiment.

FIG. 11 is a diagram showing an example of a switch virtual HBA management table according to the first embodiment.

FIG. 12 is a diagram showing an example of an input/output management table according to the first embodiment.

FIG. 33 is a flowchart showing an example of a virtual HBA management table according to the second embodiment.

DETAILED DESCRIPTION OF THE EXEMPLARY EMBODIMENT

Next are described exemplary embodiments for carrying out the present invention with reference to related drawings.

[First Embodiment]

<<System Configuration>>

Figure 1:
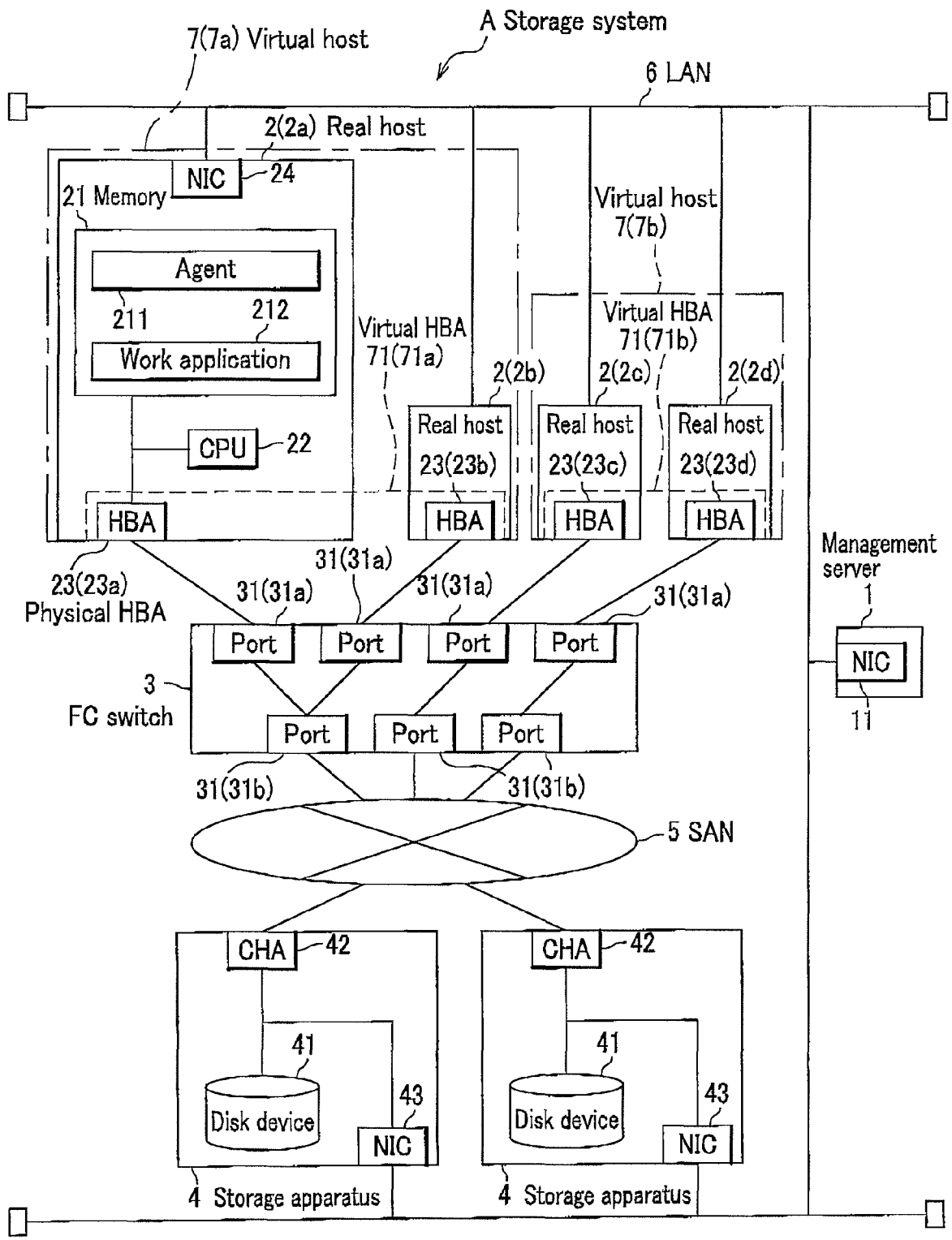
FIG. 1 is a diagram showing an example of a configuration of a storage system according to a first embodiment.

FIG. 1 shows an example of a configuration of a storage system according to a first embodiment.

A storage system A includes a management server 1, a real host 2 (which may also be referred to as a host computer), an FC switch 3, and a storage apparatus 4. The "real" host 2 is so called because it requires to be distinguished from a "virtual" host 7 to be described later. The management server 1, real host 2, and storage apparatus 4 are connected to a LAN (Local Area Network) 6 via NICs (Network Interface Cards) 11, 24, 43, respectively. The real host 2 is connected to a port 31 in a position nearer to the real host 2, which may also referred to as a port 31a, of the FC switch 3 via a physical HBA 23. A port 31 in a position nearer to the storage apparatus 4, which may also be referred to as a port 31b, of the FC switch 3 is connected to a CHA (Channel Adapter) 42 of the storage apparatus 4 via a SAN 5.

The real host 2 includes a CPU (Central Processing Unit) 22 and a memory 21 in addition to the NIC 24 and the physical HBA 23. In the memory 21, a work application 212 read from the storage apparatus 4 or an agent program (to be hereinafter referred to as an agent) 211 for monitoring and collecting equipment information on the real host 2 itself is developed and executed by the CPU 22. The CPU 22, memory 21, NIC 24, and physical HBA 23 are connected to each other via a bus.

The storage apparatus 4 includes a disk device 41 which is connected to the CHA 42 and the NIC 43 via a bus. A detailed configuration of the storage apparatus 4 will be described later. Detailed configurations of the management server 1 and FC switch 3 will also be described later. Note that the disk device 41 may be a nonvolatile storage device such as a flash device.

In this embodiment, a plurality of physical HBAs 23, each of which is a physical interface disposed in the real host 2 are grouped for each work application 212 executed in the real host 2. Each of the virtually-grouped HBAs is herein referred to as a virtual HBA (which may also be referred to as a virtual interface) 71. A host which is regarded to virtually have the virtual HBA 71 is herein referred to as a virtual host (which may also be referred to as a virtual host computer) 7.

For example, in FIG. 1, physical HBAs 23a, 23b equipped in respective real hosts 2a, 2b which execute one and same work application 212 are collectively referred to as a virtual HBA 71a. The real hosts 2a, 2b are collectively referred to as a virtual host 7a. Similarly, physical HBAs 23c, 23d equipped in respective hosts 2c, 2d which execute another and same work application 212 are collectively referred to as a virtual HBA 71b. So are the real hosts 2c, 2d as a virtual host 7b.

Information on the virtual HBA 71 and virtual host 7 is managed by the management server 1 and the FC switch 3. Note that the real host 2 may have a plurality of the physical HBAs 23.

<Management Server>

Figure 2:
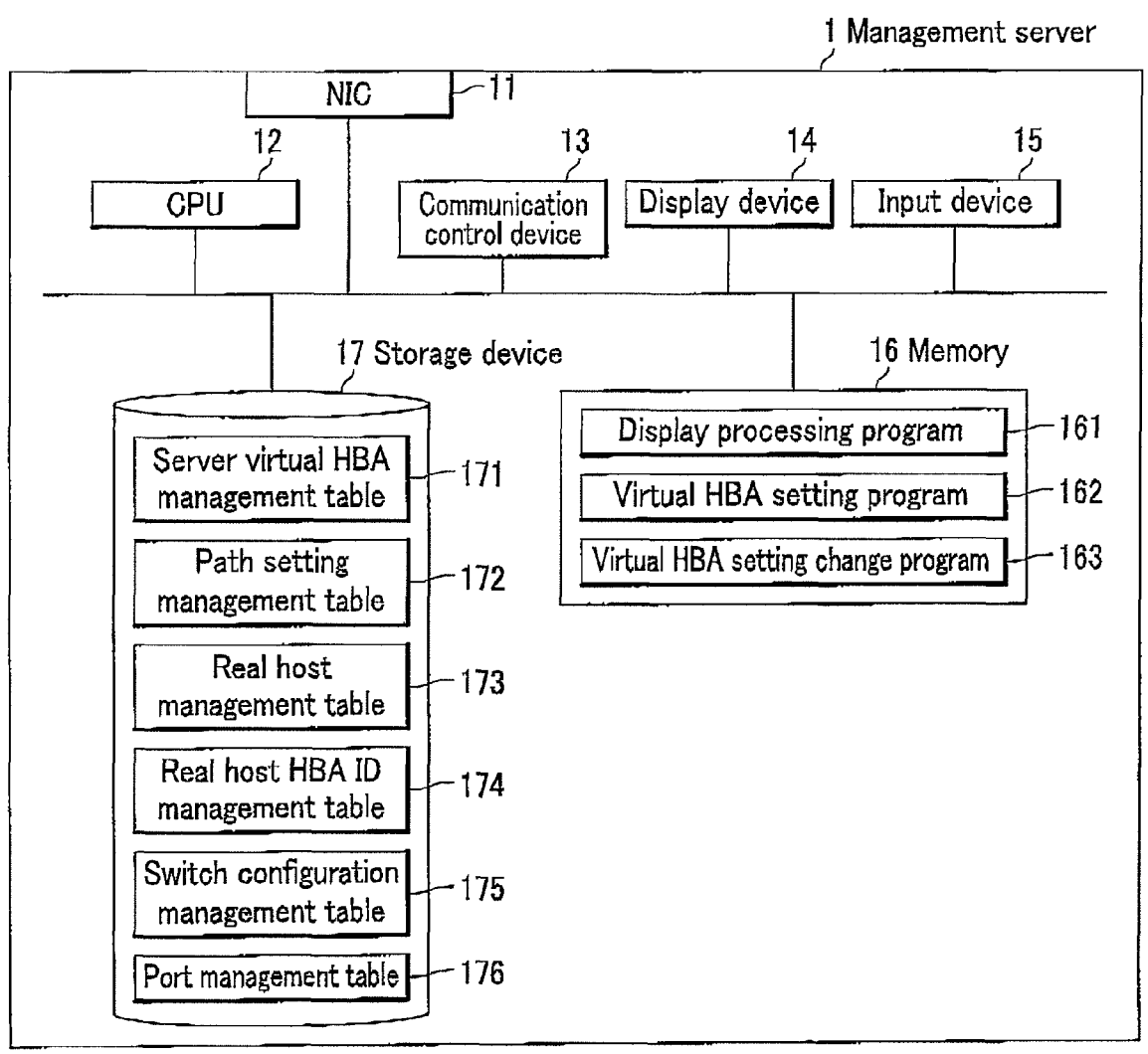
FIG. 2 is a diagram showing an example of a hardware configuration of a management server according to the first embodiment.

FIG. 2 shows an example of a hardware configuration of the management server according to the first embodiment.

The management server 1 performs setting management of the virtual HBA 71 or the virtual host 7. The management server 1 includes the NIC 11, the CPU 12, a communication control device 13, a display device 14, an input device 15, memory 16, a storage device 17, which are connected to each other via a bus.

The communication control device 13 controls communications to the LAN 6. The display device 14 may be a display screen. The input device 15 may be a keyboard and a mouse.

The storage device 17 may be configured by a nonvolatile storage device such as an HD (Hard Disk) and a flash memory. The storage device 17 stores therein a server virtual HBA management table 171 (which may also be referred to as a server virtual interface management information, ditto below), a path setting management table 172 (volume information), a real host management table 173 (host information), a real host HBA ID management table 174 (host information), a switch configuration management table 175, and a port management table 176. The tables 171 to 176 will be described later.

The memory 16 may be configured by a volatile storage device such as a RAM (Random Access Memory). A display processing program 161 (which may also be referred to as a display processing part, ditto below), a virtual HBA setting program 162 (a virtual interface setting part), and a virtual HBA setting change program 163 (a virtual interface setting change part) each stored in the storage device 17 are developed in the memory 16 and are embodied when executed by the CPU 12. Functions of the programs 161 to 163 will be described later in detail.

<FC Switch>

Figure 3:
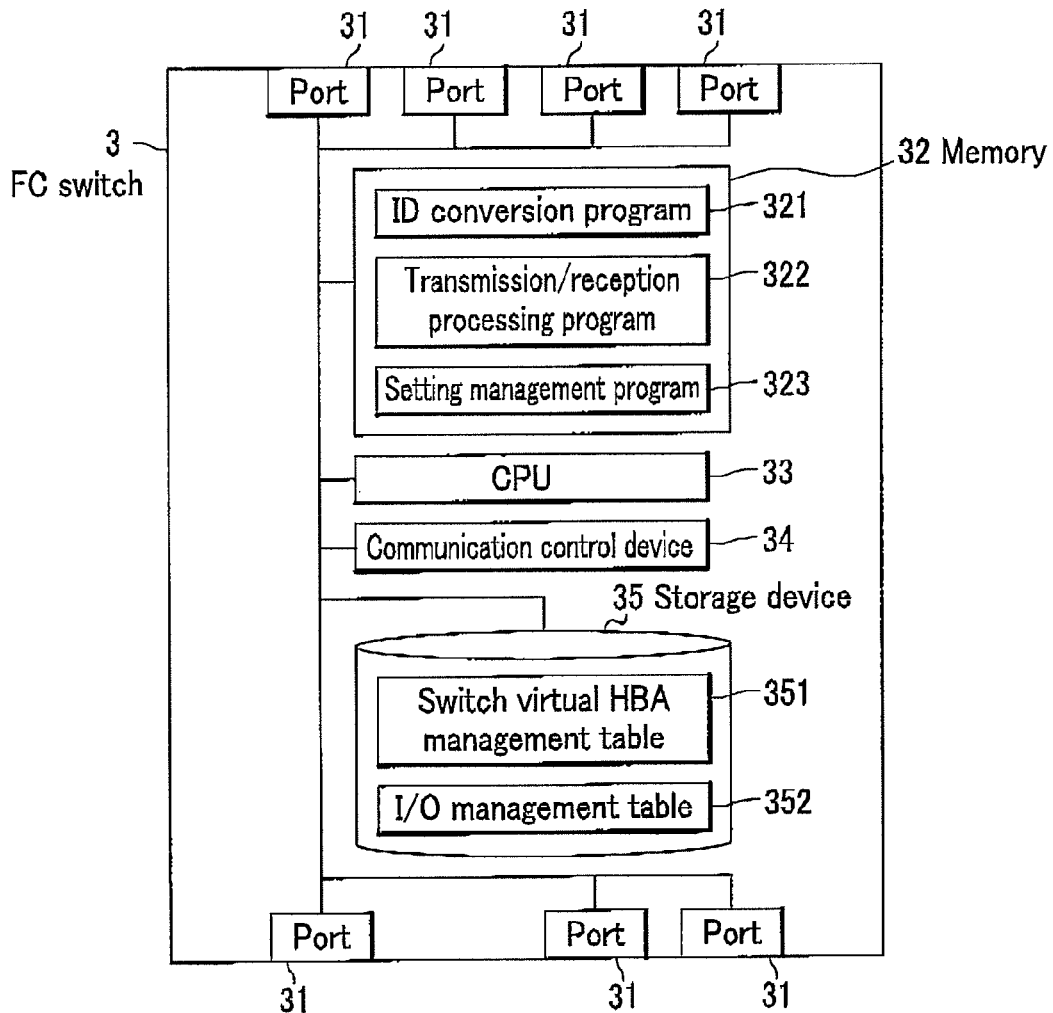
FIG. 3 is a diagram showing an example of a hardware configuration of an FC switch according to the first embodiment.

FIG. 3 shows an example of a hardware configuration of an FC switch according to the first embodiment.

The FC switch 3 relays information between the real host 2 via the SAN 5 (see FIG. 1) and the storage apparatus 4. The FC switch 3 includes a port 31, a memory 32, a CPU 33, a communication control device 34, and a storage device 35, which are connected to each other via a bus. The storage device 35 may also be referred to as a storage part and may be configured by a nonvolatile storage device such as an EPROM (an Erasable Programmable Read Only Memory) and a flash memory. The storage device 35 stores therein a switch virtual HBA management table 351 (which may also be referred to as a switch virtual interface management information, ditto below) and an I/O (input/output) management table 352 (I/O management information). The tables 351,352 will be described later in detail.

The memory 32 may be configured by a volatile storage device such as a RAM. An ID conversion program 321 (which may also be referred to as an ID conversion part, ditto below), a transmission/reception processing program 322 (a transmission/reception part), and a setting management program 323 (a setting management part) each stored in the storage device 35 are developed in the memory 32 and are embodied when executed by the CPU 33. Functions of the programs 321 to 323 will be described later in detail.

<Storage Apparatus>

Figure 4:
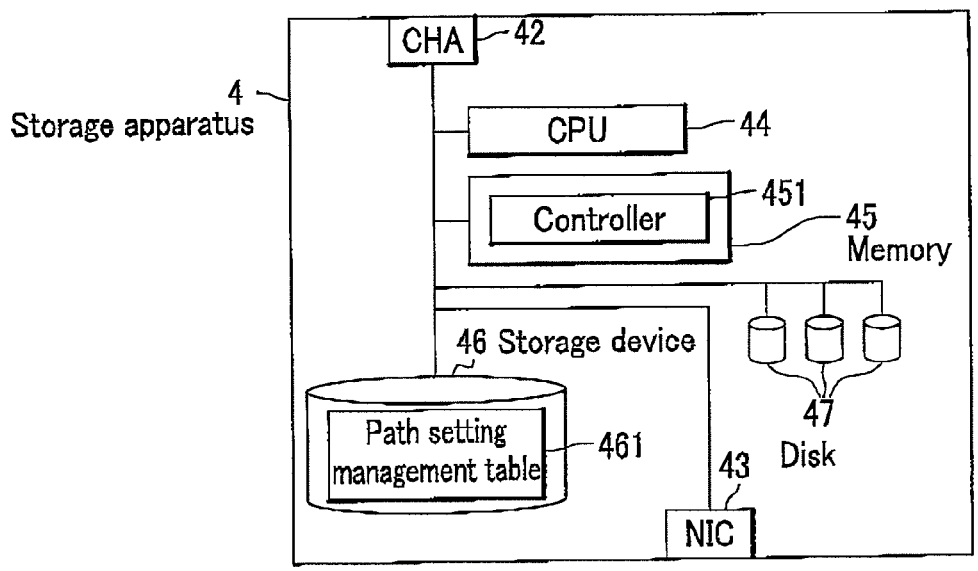
FIG. 4 is a diagram showing an example of a hardware configuration of a storage apparatus according to the first embodiment.

FIG. 4 shows an example of a hardware configuration of a storage apparatus according to the first embodiment.

The storage apparatus 4 includes a CHA 42, a NIC 43, a CPU 44, a memory 45, a storage device 46, and a disk 47, which are connected to each other via a bus.

The storage device 46 may be configured by a nonvolatile storage device such as an HD and a flash memory and stores therein a path setting management table 461 for the storage apparatus 4. The path setting management table 461 will be described later in detail.

The memory 45 may be configured by a volatile storage device such as a RAM. In the memory 45, a controller 451 for controlling a read from and a write into a disk 47 is developed and is embodied when executed by the CPU 44.

The disk 47 stores therein the work application 212 which is read by the real host 2 or the like. In this embodiment, it is assumed that an array group or a volume generated by using RAIDs (Redundant Array of Inexpensive Disks) to a plurality of the disks 47. However, a configuration thereof is not limited to this. Respective disks 47 may be used independently. Or, one flash memory may be used as one disk 47. In this embodiment, the disk 47 in which the work application 212 or the like is stored is referred to as a volume.

Note that the disk device 41 in FIG. 1 includes the storage device 46 and the disk 47. In this embodiment, the storage device 46 and the disk 47 are separately provided. However, a configuration thereof is not limited to this. The disk 47 may store therein the path setting management table 461.

<<Tables>>

Next are described tables according to the first embodiment with reference to FIG. 5 to FIG. 12 as well as FIG. 1 to FIG. 4 where necessary. How information in the tables is collected will be described later.

<Server Virtual HBA Management Table>

FIG. 5 shows an example of a server virtual HBA management table according to the first embodiment.

The server virtual HBA management table 171 (which may also be referred to as server vertical interface management information) is a table stored in the storage device 17 of the management server 1. The server virtual HBA management table 171 stores therein information on the virtual HBA 71 and information on the work application 212, which are associated with each other. In this embodiment, a plurality of the physical HBAs 23 are grouped according to types of the work application 212 to be used, and the virtually-grouped physical HBAs 23 are each viewed as the virtual HBA 71. The server virtual HBA management table 171 shows which virtual HBA 71 corresponds to which work application 212.

The server virtual HBA management table 171 includes a record number, a virtual HBA ID (which may also be referred to as a virtual interface identifier, ditto below), a virtual host name, a physical HBA ID list (a physical interface identifier), application information (grouping information), and an FC switch name.

The virtual HBA ID and the virtual host name are registered by a user onto a virtual host setting screen via the input device 15, details of which will be described later. The virtual HBA ID is registered in WWN (World Wide Name) format.

The physical HBA ID list includes an identifier of the physical HBA 23 (which may also be referred to as a physical HBA ID) assigned to the virtual HBA 71. The physical HBA ID list includes one or more physical HBA IDs. In FIG. 5, the physical HBA ID list registers the physical HBA IDs in forms of "List_A", "List_B", and so on. This means that the physical HBA ID list is stored in a list file having a list name of "List_A" or the like in the storage device 17 of the management server 1.

The application information includes information such as a name of the work application 212 which is a reference for grouping in setting the virtual HBA 71 (which may also be referred to as grouping information). The FC switch name includes information showing the FC switch 3 at which the virtual HBA 71 is set.

<Path Setting Management Table>

FIG. 6 shows an example of a path setting management table according to the first embodiment.

The path setting management tables 172,461 (which may also be referred to as volume information) are stored in the storage device 17 of the management server 1 and the storage device 46 of the storage apparatus 4, respectively. The path setting management tables 172,461 manage a path setting of the storage apparatus 4 and store therein a physical HBA ID which is accessible to a volume.

The path setting management tables 172,461 store therein a record number, a storage name, a volume ID, a capacity, a port ID, and a security physical HBA ID list.

The storage name is a name of the storage apparatus 4. The volume ID is an ID of a volume corresponding to the port 31 stored at a column of the port ID. The capacity is a capacity of a volume indicated by a volume ID. The port ID is an ID of the port 31 corresponding to a volume indicated by a volume ID. The security physical HBA ID list includes a plurality of physical HBA IDs and virtual HBA IDs accessible to a volume indicated by a volume ID. Note that a user registers a data into the security physical HBA ID list.

<Real Host Management Table>

FIG. 7 shows an example of a real host management table according to the first embodiment.

The real host management table 173 (which may also be referred to as host information) is stored in the storage device 17 of the management server 1 and manages information on the real host 2.

The real host management table 173 stores therein a record number, a host name, an IP (Internet Protocol) address of the real host 2, OS (Operating System) information, and application information.

The host name is a name of the real host 2. The IP address of the real host 2 is an IP address owned by the real host 2 indicated by the host name. The OS information includes a name of an OS executed in the real host 2 of interest. The application information is a name of the work application 212 executed in the real host 2 of interest.

<Real Host HBA ID Management Table>

FIG. 8 shows an example of a real host HBA ID management table according to the first embodiment.

The real host HBA ID management table 174 (which may also be referred to as host information) is stored in the storage device 17 of the management server 1 and manages an ID of the physical HBA 23 disposed in the real host 2.

The real host HBA ID management table 174 stores therein a record number, a host name, and a physical HBA ID.

The physical HBA ID is an identifier assigned to the physical HBA 23 disposed in the real host 2 indicated by a host name of interest. The physical HBA ID is registered in WWN format.

<Switch Configuration Management Table

FIG. 9 shows an example of a switch configuration management table according to the first embodiment.

The switch configuration management table 175 is stored in the storage device 17 of the management server 1 and manages information on the FC switch 3 disposed in the storage system A.

The switch configuration management table 175 stores therein a record number, an FC switch name, an IP address of the FC switch 3.

The IP address of the FC switch 3 is an IP address assigned to the FC switch 3 indicated by the FC switch name.

<Port Management Table>

FIG. 10 shows an example of a port management table according to the first embodiment.

The port management table 176 is stored in the storage device 17 of the management server 1 and stores therein information on the port 31 in the FC switch 3.

The port management table 176 includes a record number, an FC switch name, an FC switch port name, an FC switch port ID, and a port destination ID.

The FC switch port name is a name of the port 31 disposed in the FC switch 3 indicated by an FC switch name of interest. The FC switch port ID is an identifier of the port 31 indicated by an FC switch port name. The port destination ID is an ID of a device connected to the port 31. For example, if the device is the physical HBA 23, the port destination ID stored is a physical HBA ID thereof. If the device is the virtual HBA 71, the port destination ID stored is a virtual HBA ID thereof.

<Switch Virtual HBA Management Table>

FIG. 11 shows an example of a switch virtual HBA management table according to the first embodiment.

The switch virtual HBA management table 351 (which may also be referred to as switch virtual interface management information) is stored in the storage device 35 of the FC switch 3 and stores therein a relation between the virtual HBA 71 and the physical HBA 23.

The switch virtual HBA management table 351 stores therein a record number, a virtual HBA ID (which may also be referred to as a virtual interface identifier), a physical HBA ID list which lists a physical interface identifier, and a port ID of the FC switch 3.

The physical HBA ID list is a list of a physical HBA ID assigned to the virtual HBA 71 indicated by the virtual HBA ID and is similar to the physical HBA ID list shown in FIG. 5, and a description thereof is omitted herefrom.

The port ID of the FC switch 3 is an identifier of the port 31*b* positioned nearer to the storage apparatus 4, to which the virtual HBA 71 is actually assigned.

<I/O Management Table>

FIG. 12 shows an example of an I/O management table according to the first embodiment.

The I/O management table 352 (which may also be referred to as I/O management information) is stored in the storage device 35 of the FC switch 3. The I/O management table 352 stores therein a physical HBA ID when a data is transmitted from the real host 2 to the storage apparatus 4, and information on conversion of a virtual HBA ID.

The I/O management table 352 includes a record number, a physical HBA ID owned by the real host 2, a port ID of the storage apparatus 4, a virtual HBA ID, and an exchange ID.

The physical HBA ID owned by the real host 2 is a physical HBA ID of a physical HBA owned by the real host 2. The port ID of the storage apparatus 4 is a port ID in the storage apparatus 4 as the name implies. The virtual HBA ID indicates that the physical HBA 23 associated with the transmitted data is substituted by a virtual HBA having the virtual HBA ID. In other words, the physical HBA ID added to the transmitted data and owned by the real host 2 is substituted by an ID shown at a column of the virtual HBA ID, and then, the substituted physical HBA ID is transmitted to the port 31*b* indicated by a port ID of the storage apparatus 4.

The exchange ID is a number assigned at the real host 2. In the first embodiment, when a data is transmitted from the real host 2 to the storage apparatus 4, the controller 451 of the FC switch 3 converts a physical HBA ID added to the data into a virtual HBA ID. However, a physical HBA ID is not always assigned to a virtual HBA ID one to one. Therefore, if the data is returned from the storage apparatus 4 to the real host 2, the controller 451 may not correctly convert the virtual HBA ID to the originating physical HBA ID. The controller 451 thus stores a set of information made up of an exchange ID, a physical HBA ID, and a vertical HBA ID converted therefrom, in the I/O management table 352. This allows the controller 451 to correctly convert a virtual HBA ID into an originating physical HBA ID. The conversion between the physical HBA ID and the virtual HBA ID will be described later.

<<Examples of Screens>>

Next are described examples of screens according to the first embodiment with reference to FIG. 13 to FIG. 21 as well as FIG. 2 where necessary. Note that it is the display processing program 161 of the management server 1 that makes the display device 14 display the screen examples shown in FIG. 13 to FIG. 21.

<Virtual Host Management Screen>

Figure 13:
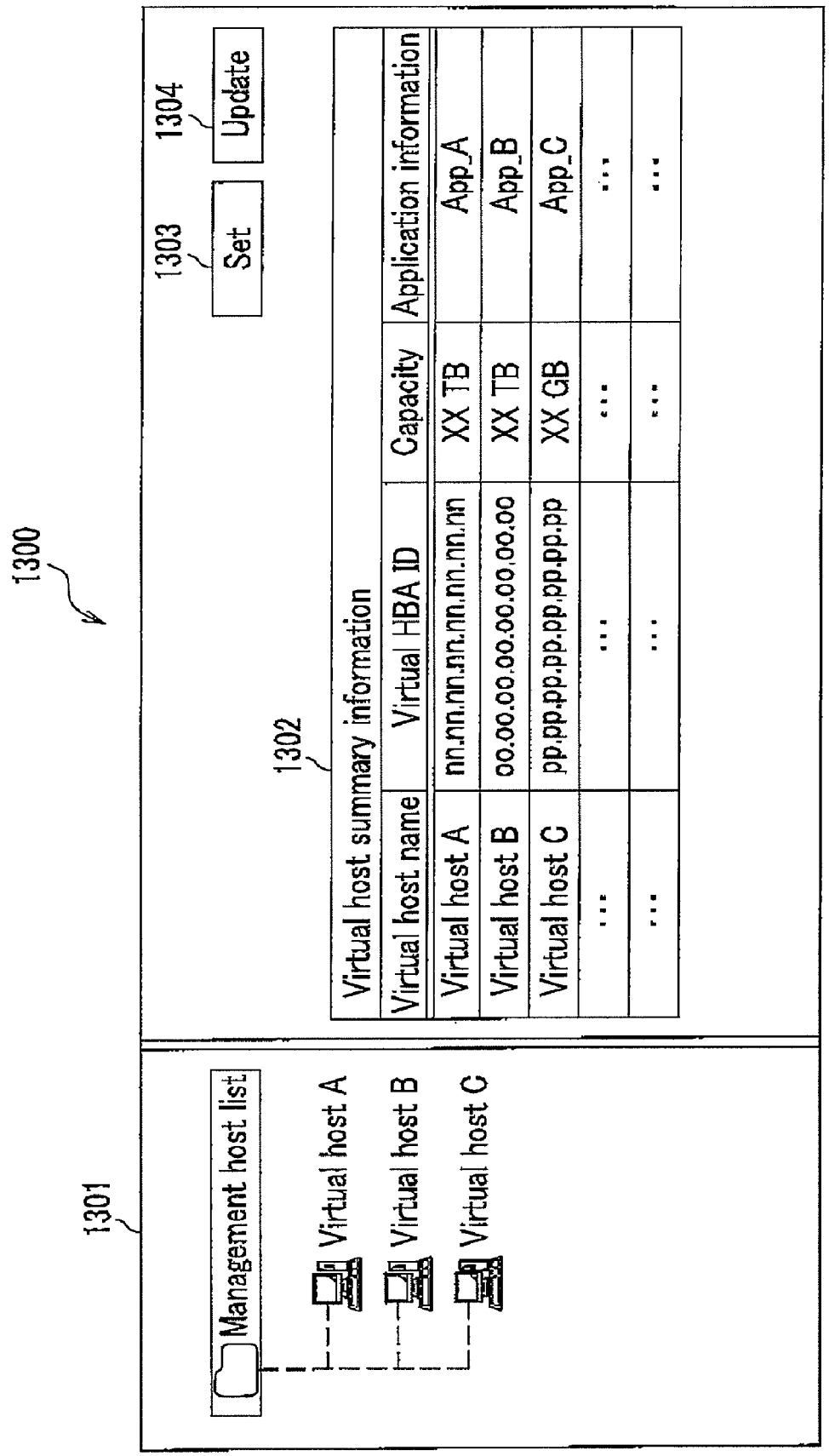
FIG. 13 is a diagram showing an example of a virtual host management screen according to the first embodiment.
Figure 14:
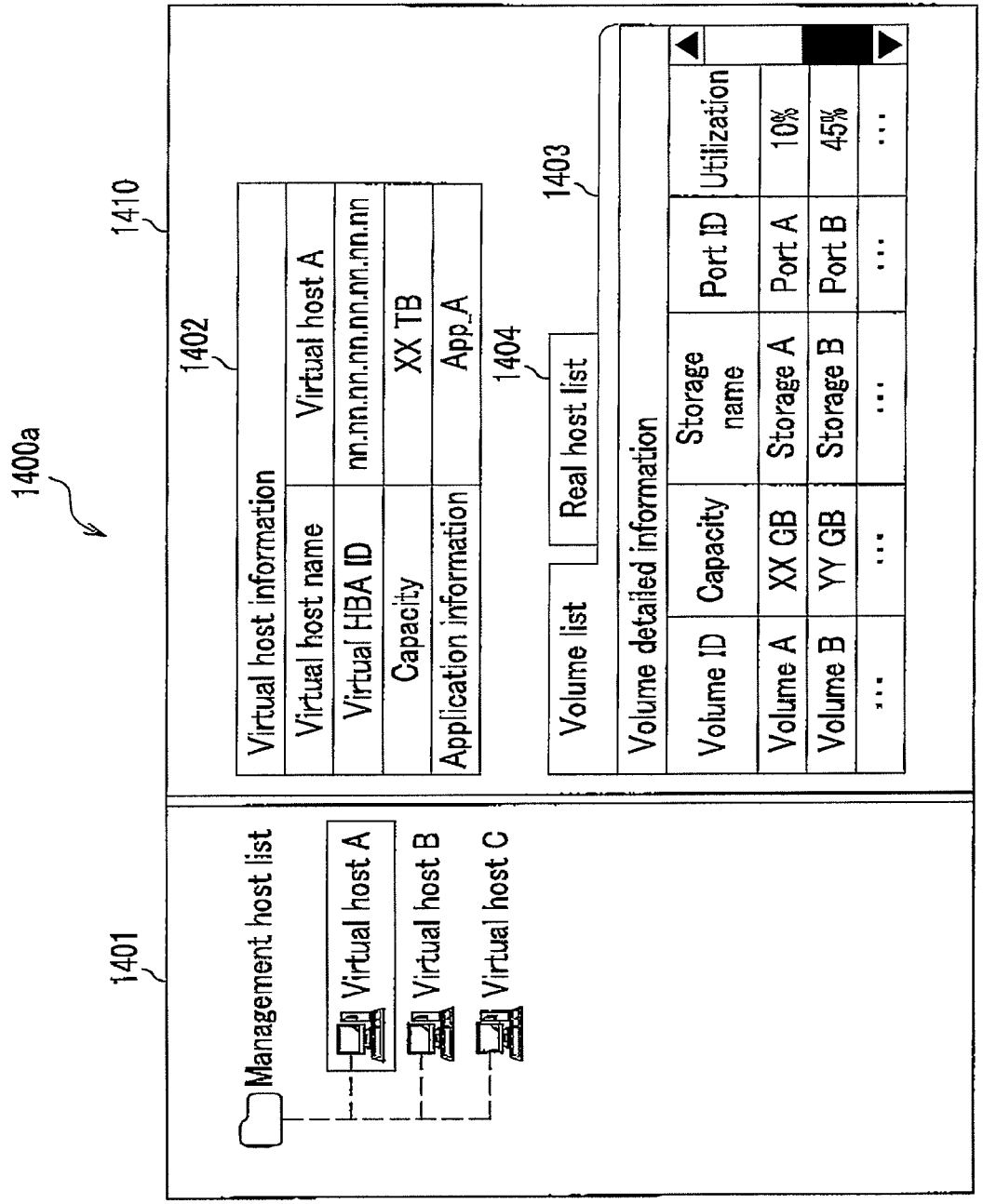
FIG. 14 is a diagram showing an example of a selected virtual host management screen according to the first embodiment.
Figure 15:
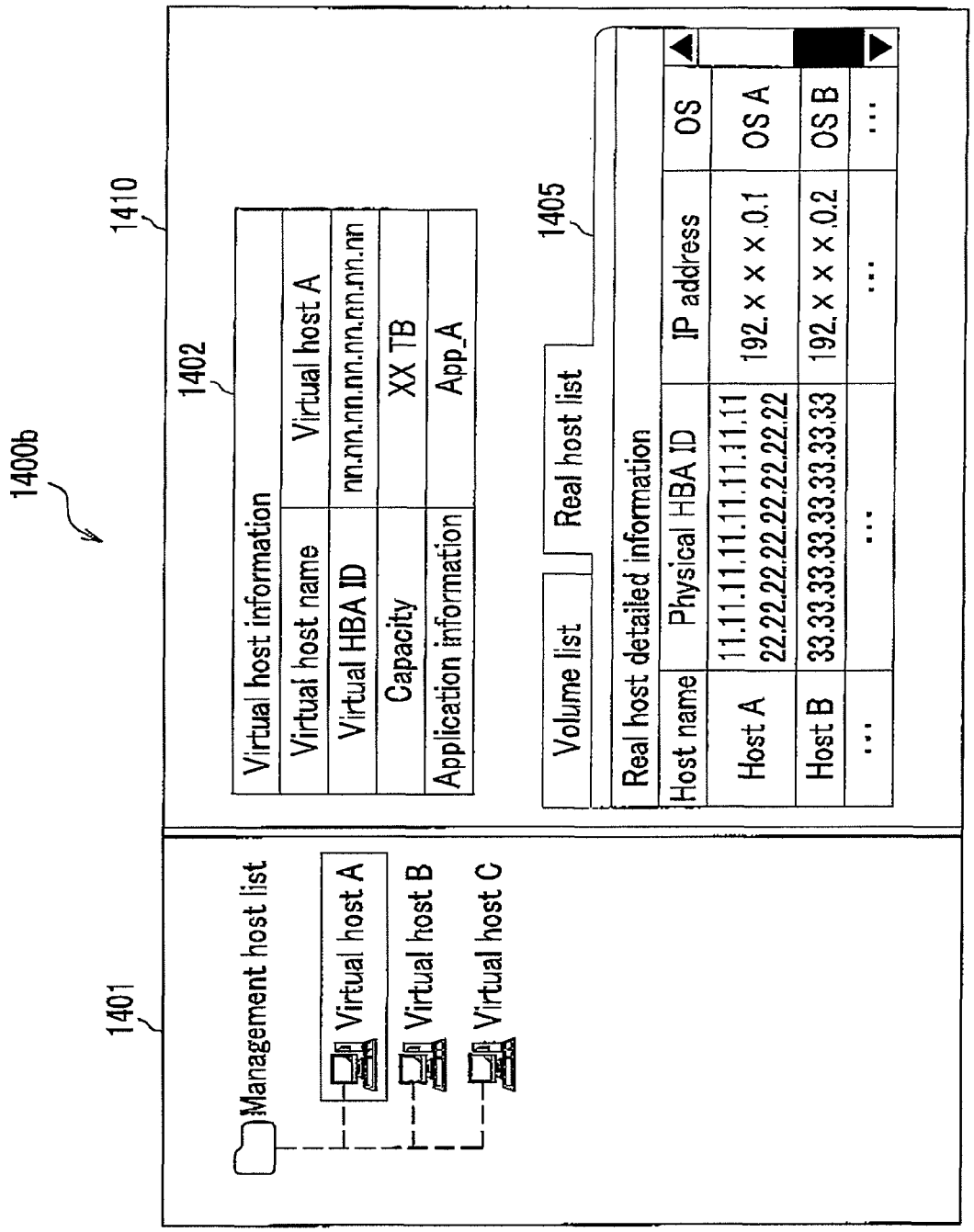
FIG. 15 is a diagram showing another example of the selected virtual host management screen according to the first embodiment.

FIG. 13 to FIG. 15 show examples of virtual host management screens according to the first embodiment. Note that the screens of FIG. 13 to FIG. 21 are actually managed by the virtual HBA 71 but are herein described as if managed by the virtual host 7 in which the virtual HBA is disposed for an easier understanding. In FIG. 16 to FIG. 21, if a cancel button is pressed, an ongoing process is stopped and a previous screen is registration-displayed (in FIG. 13, if the cancel button is pressed, the processing is terminated). Such a cancel button is not shown on the screens of FIG. 13 to FIG. 15 but may be shown thereon.

In FIG. 13, the virtual host management screen 1300 includes a virtual host list display area 1301 and a virtual host summary information display area 1302 and displays information on a plurality of the virtual hosts 7 such that the information is selectable via the input device 15.

The virtual host list display area 1301 displays a list of currently-set virtual hosts 7 in tree view.

The virtual host summary information display area 1302 displays summary information on the virtual host 7 displayed in the virtual host list display area 1301. The summary information on the virtual host 7 includes a virtual host name, a virtual HBA ID assigned to the virtual host 7, a capacity of a volume assigned to the virtual host 7, and information on the work application 212 executed in the virtual host 7 (which may also be referred to as application information). The virtual HBAs 71 (or the virtual hosts 7) displayed on the virtual host management screen corresponds to the grouped physical HBAs 23 by the work application 212 displayed at a column of the application information.

The virtual host list display area 1301 is displayed when the display processing program 161 references the server virtual HBA management table 171 of FIG. 5. The virtual host summary information display area 1302 is displayed when the display processing program 161 references the server virtual HBA management table 171 of FIG. 5 and the path setting management table 172 of FIG. 6. More specifically, the display processing program 161 obtains a virtual HBA ID, a virtual host name corresponding to the virtual HBA ID, a physical HBA ID list, and application information from the server virtual HBA management table 171. The display processing program 161 then retrieves the security physical HBA ID list in the path setting management table 172 (see FIG. 6) using the physical HBA ID registered in the obtained physical HBA ID list as a key, identifies an appropriate record therein, and obtains a capacity of a volume of the storage apparatus 4 (which may also be referred to as volume information), from the identified record in the path setting management table 172. The display processing program 161 displays the obtained capacity of the volume, virtual HBA ID, application information, or the like on the display device 14. A set button 1303 and an update button 1304 will be described later.

Upon selection of any one of the virtual hosts 7 displayed in the virtual host list display area 1301 via the input device 15, the display processing program 161 makes the display device 14 display a selected virtual host management screen 1400a shown in FIG. 14 for displaying detailed information on the selected virtual host 7.

In FIG. 14, the virtual host list display area 1401 has a configuration similar to that of the virtual host list display area 1301 in FIG. 13, and a description thereof is omitted. The display processing program 161 displays detailed information on the virtual host 7 selected in the virtual host list display area 1401, on a virtual host detailed information display area 1410.

The selected virtual host summary information display area 1402 displays information on a record of the selected virtual host 7, which is similar to the information in the virtual host summary information display area 1302 of FIG. 13.

The volume information display area 1403 displays information on a volume assigned to the selected virtual host 7. The displayed information includes information identified as shown in FIG. 13 and registered in the record in the path setting management table 172 (see FIG. 6) and a value calculated by the display processing program 161 based on the identified and registered information.

A real host information display area 1405 (see FIG. 15) is hidden behind the volume information display area 1403. Upon a selection input of a tab 1404, the display processing program 161 makes the display device 14 display another selected virtual host management screen 1400b shown in FIG. 15.

In FIG. 15, the virtual host list display area 1401 and the selected virtual host summary information display area 1402 are similar to the virtual host list display areas 1301,1401 and the selected virtual host summary information display areas 1302,1402 in FIG. 13 and FIG. 14, respectively, and a description thereof is omitted.

The real host information display area 1405 displays information on the real host 2 related to the selected virtual host 7 or subjected to grouping. The real host information display area 1405 displays information on the real host 2 such as a host name of the real host 2, a physical HBA ID of the physical HBA 23 disposed in the real host 2, an IP address assigned to the real host 2, and OS information. The IP address of the real host 2 and the OS information are obtained by the display processing program 161 using each physical HBA ID in the physical HBA ID list in the server virtual HBA management table 171 (see FIG. 5) as a key, from the real host management table 173 (see FIG. 7).

<Virtual Host Setting Screen>

Figure 16:
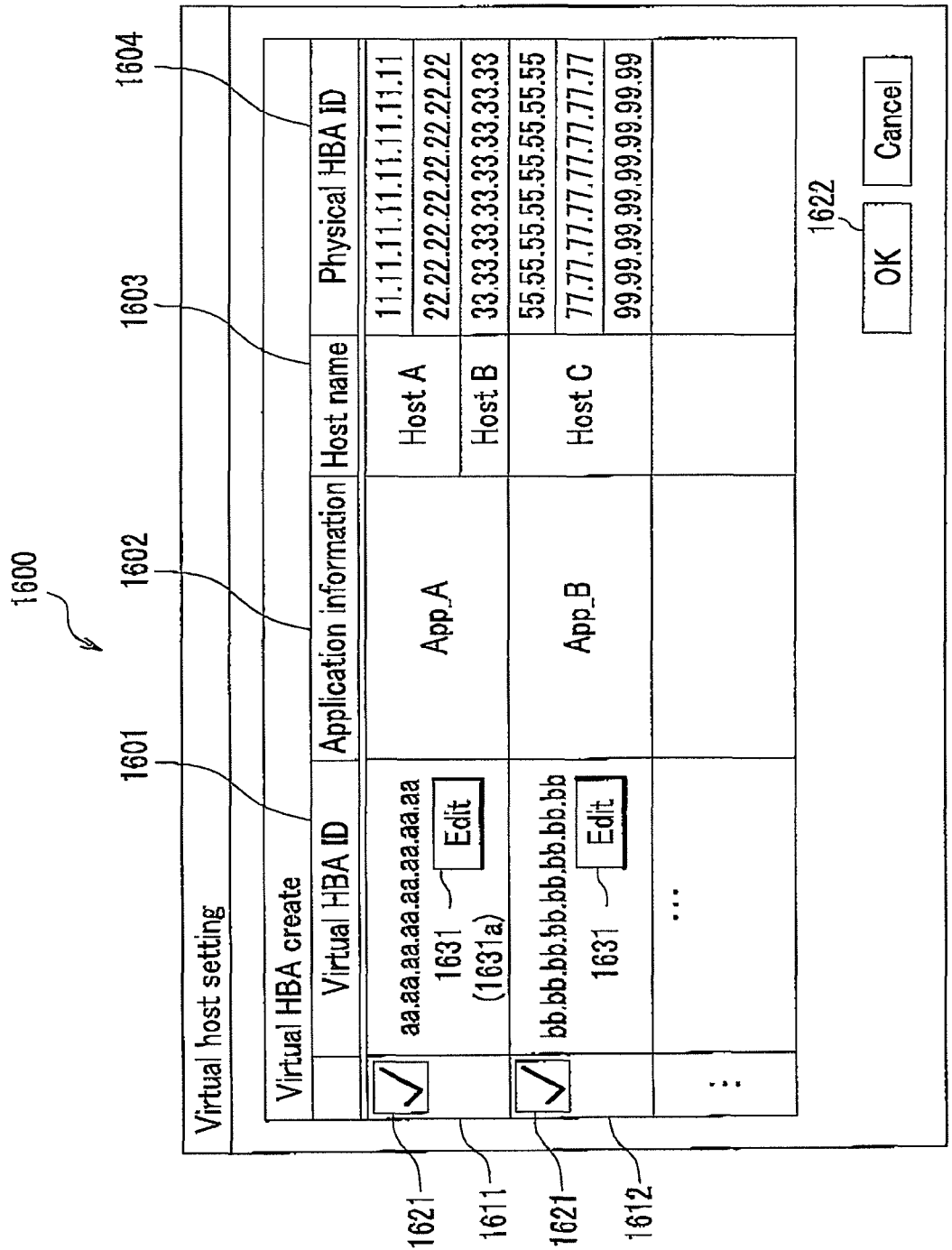
FIG. 16 is a diagram showing an example of a virtual host setting screen according to the first embodiment.
Figure 17:
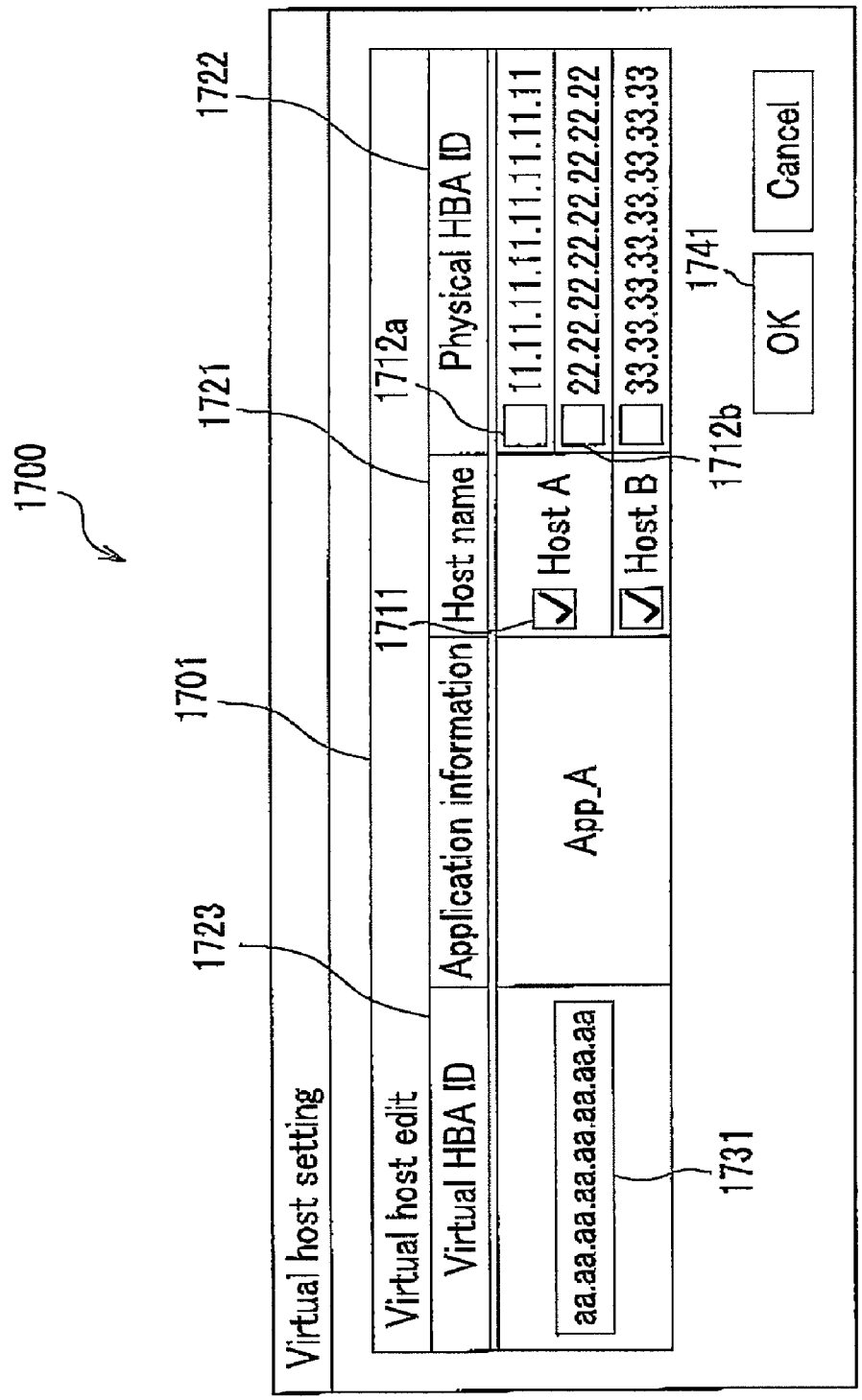
FIG. 17 is a diagram showing an example of an individual virtual host setting screen according to the first embodiment.
Figure 18:
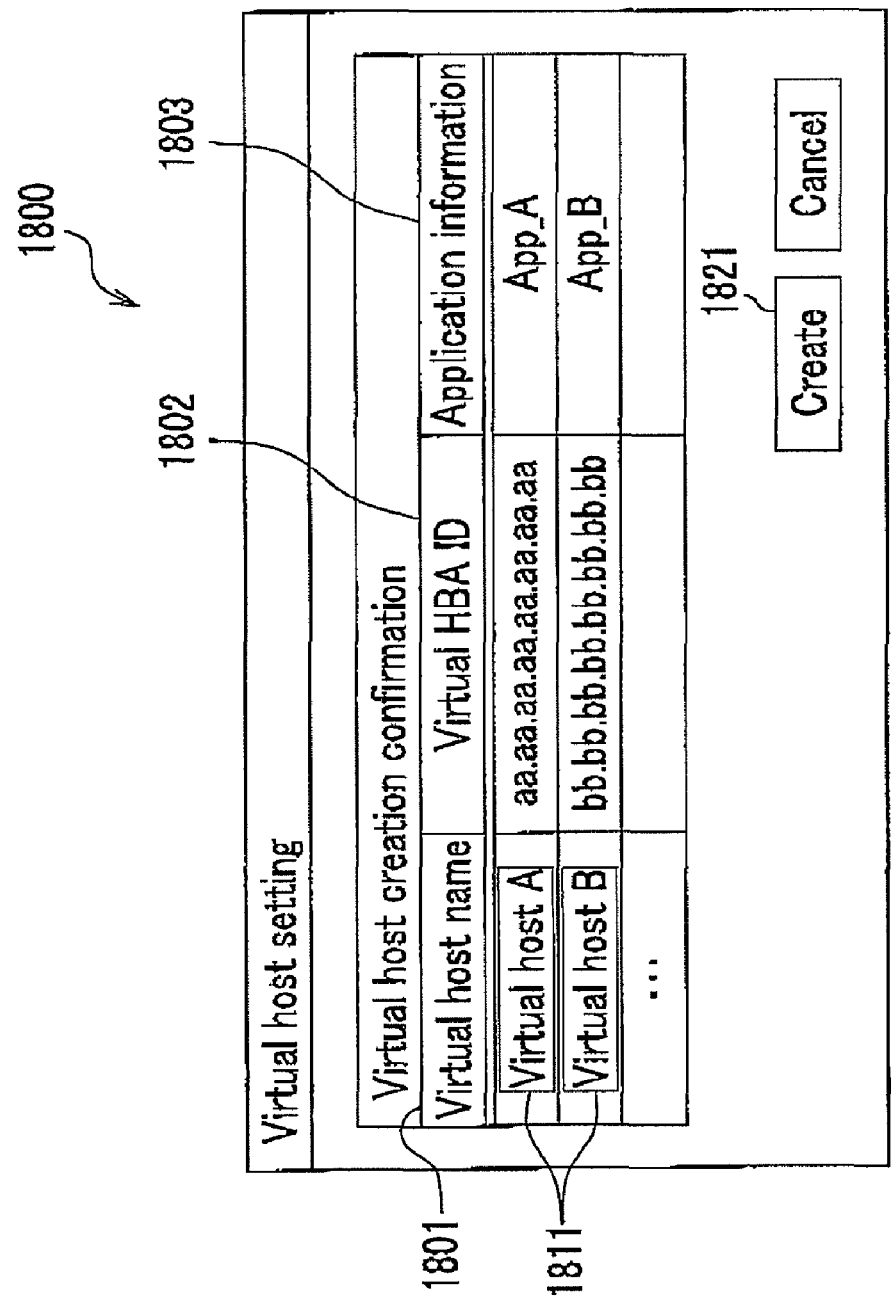
FIG. 18 is a diagram showing an example of a virtual host confirmation screen according to the first embodiment.

Next is described a virtual host setting screen with reference to FIG. 16 to FIG. 18 as well as FIG. 1 and FIG. 2 where necessary.

FIG. 16 to FIG. 18 show examples of virtual host setting screens according to the first embodiment. Note that FIG. 16 to FIG. 18 are displayed when the storage system A is newly build, the management server 1 is started, the virtual HBA 71 is reset, and a new real host 2 in which a new work application 212 is executed is added to the storage system A and a user then presses the set button 1303 of FIG. 13.

Upon pressing of the set button 1303 of FIG. 13, the virtual HBA setting program 162 obtains information on the work application 212 executed by the agent 211 of each real host 2, a host name, and an ID of a disposed physical HBA. Based on the obtained information, the display processing program 161 then displays a virtual host setting screen 1600 shown in FIG. 16.

The virtual host setting screen 1600 includes a virtual HBA ID display area 1601, an application information display area 1602, a host name display area 1603, and a physical HBA ID display area 1604. The virtual HBA setting program 162 displays physical HBA IDs grouped for each work application 212, and further displays the physical HBA IDs to which virtual HBA IDs are assigned. As described above, a WWN is assigned to the virtual HBA ID. A plurality of WWNs are prepared at factory shipment of the FC switch 3 and are numbered, for example, with the smallest number first.

In a record 1611, for example, the real hosts 2, "HostA" and "HostB" each of which uses the work application 212, "App_A", are assigned to a virtual HBA, "aa. aa. aa. aa. aa. aa. aa. aa". IDs of physical HBAs disposed in the real host 2 "HostA" are "11.11. 11.11. 11.11. 11.11" and "22.22. 22.22. 22.22. 22.22". Similarly, an ID of a physical HBA disposed in the real host 2 "HostB" is "33.33. 33.33. 33.33. 33.33".

Ditto with the record 1612 and a description thereof is omitted herefrom.

The virtual host setting screen 1600 includes a check box 1621 for each virtual host 7. The virtual HBA setting program 162 registers only a virtual HBA 71 having the check box 1621 with a check mark. Upon pressing of an OK button 1622, the display processing program 161 displays a virtual host confirmation screen 1800 to be described later with reference to FIG. 18, on the display device 14.

Upon pressing of an edit button 1631, a user can set details of individual virtual hosts 7. For example, upon pressing of an edit button 1631a for editing the record 1611, the display processing program 161 displays an individual virtual host setting screen 1700 shown in FIG. 17 on the display device 14.

In FIG. 17, the individual virtual host setting screen 1700 includes an individual host setting area 1701, which has a configuration similar to the record 1611 in FIG. 16.

In FIG. 17, a check box 1711 in a host name display area 1721 and check boxes 1712a,1712b in a physical HBA ID display area 1722 are provided to select a real host 2 to be registered as the virtual HBA 71 or a physical HBA ID. The display area 1721 and the physical HBA ID display area 1722 are in a hierarchical structure. Therefore, if a check box in the host name display area 1721 is marked, a physical HBA ID disposed in the corresponding real host 2 is also selected. For example, if the check box 1711 is checked, the check boxes 1712a,1712b are automatically checked. It is to be noted that, in FIG. 17, the check box 1711 is checked but check marks are not placed in the check boxes 1712a,1712b for convenience of description. If a user wants to select and register only a physical HBA ID disposed in one real host 2, for example, the physical HBA ID "11.11. 11.11. 11.11. 11.11", the user marks the check box 1712a without checking the check box 1711,1712b.

The virtual HBA ID display area 1723 is a text entry box and allows for a change of a virtual HBA ID within the WWN assigned to the FC switch 3 at factory shipment.

If the OK button 1622 is pressed at this stage, the individual virtual host setting screen 1700 turns back to the virtual host setting screen 1600 of FIG. 16. In FIG. 16, at this time, the display processing program 161 does not display information not having been marked in the check boxes 1711,1712a, 1712b of FIG. 17.

As described above, upon pressing of the OK button 1622 in FIG. 16, the display processing program 161 displays a virtual host confirmation screen 1800 shown in FIG. 18 on the display device 14.

The virtual host confirmation screen 1800 includes a virtual host name display area 1801, a virtual HBA ID display area 1802, and an application information display area 1803. The virtual host name display area 1801 is a text entry box and allows for an input of a virtual host name desired by a user.

After all desired inputs or the like are completed on the virtual host confirmation screen 1800, the user presses a create button 1821. Then the virtual HBA setting program 162 performs a necessary setting of the virtual host 7 and updates the server virtual HBA management table 171 (see FIG. 5) and the switch virtual HBA management table 351 (see FIG. 11).

Since the check boxes 1621,1711,1712a,1712b are provided as shown in FIG. 16 and FIG. 17, an unintended real host 2 will not be registered as the virtual host 7 (or the virtual HBA 71), which can improve security.

<Virtual Host Update Screen>

Figure 19:
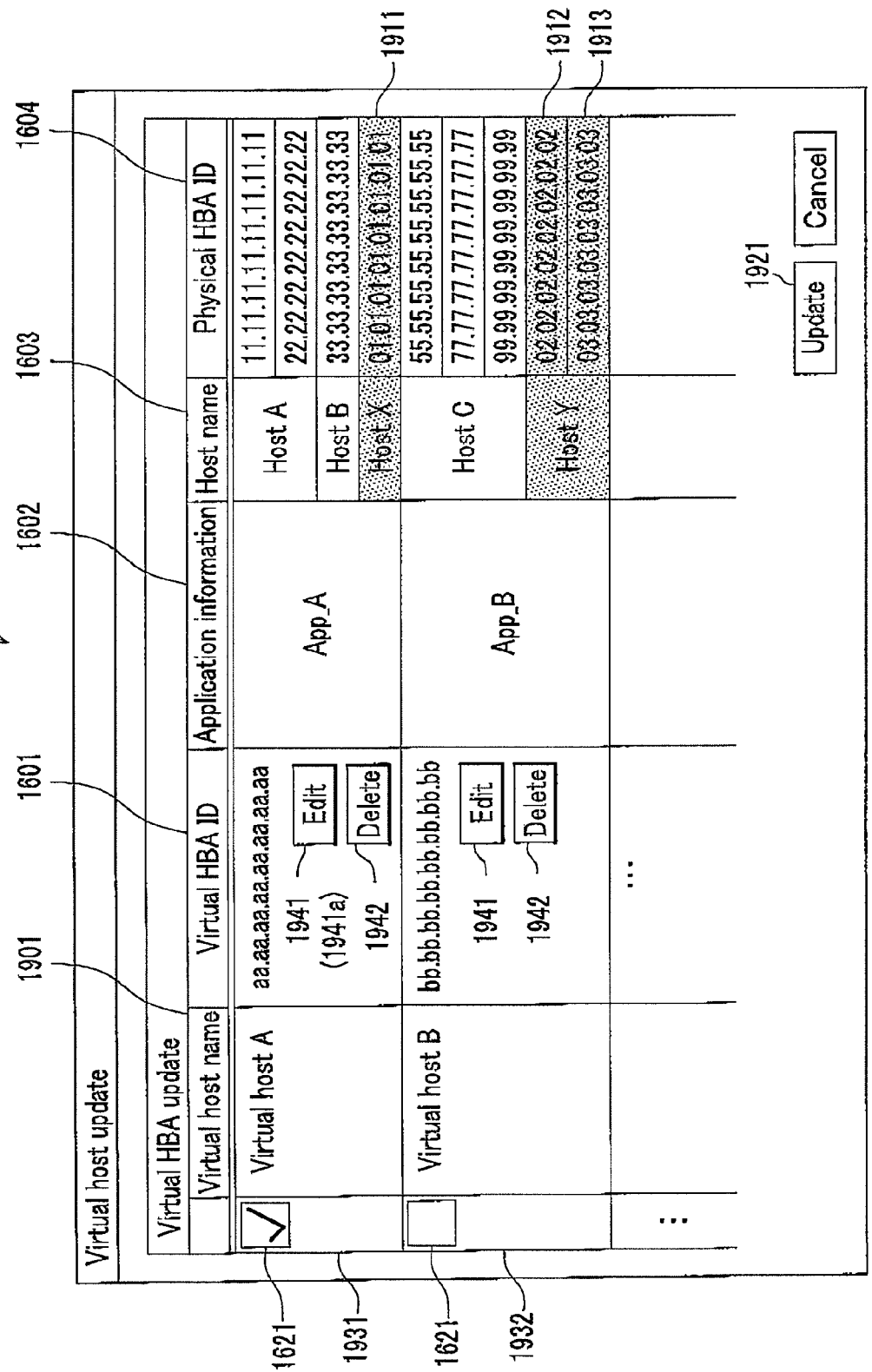
FIG. 19 is a diagram showing an example of a virtual host update screen according to the first embodiment.
Figure 20:
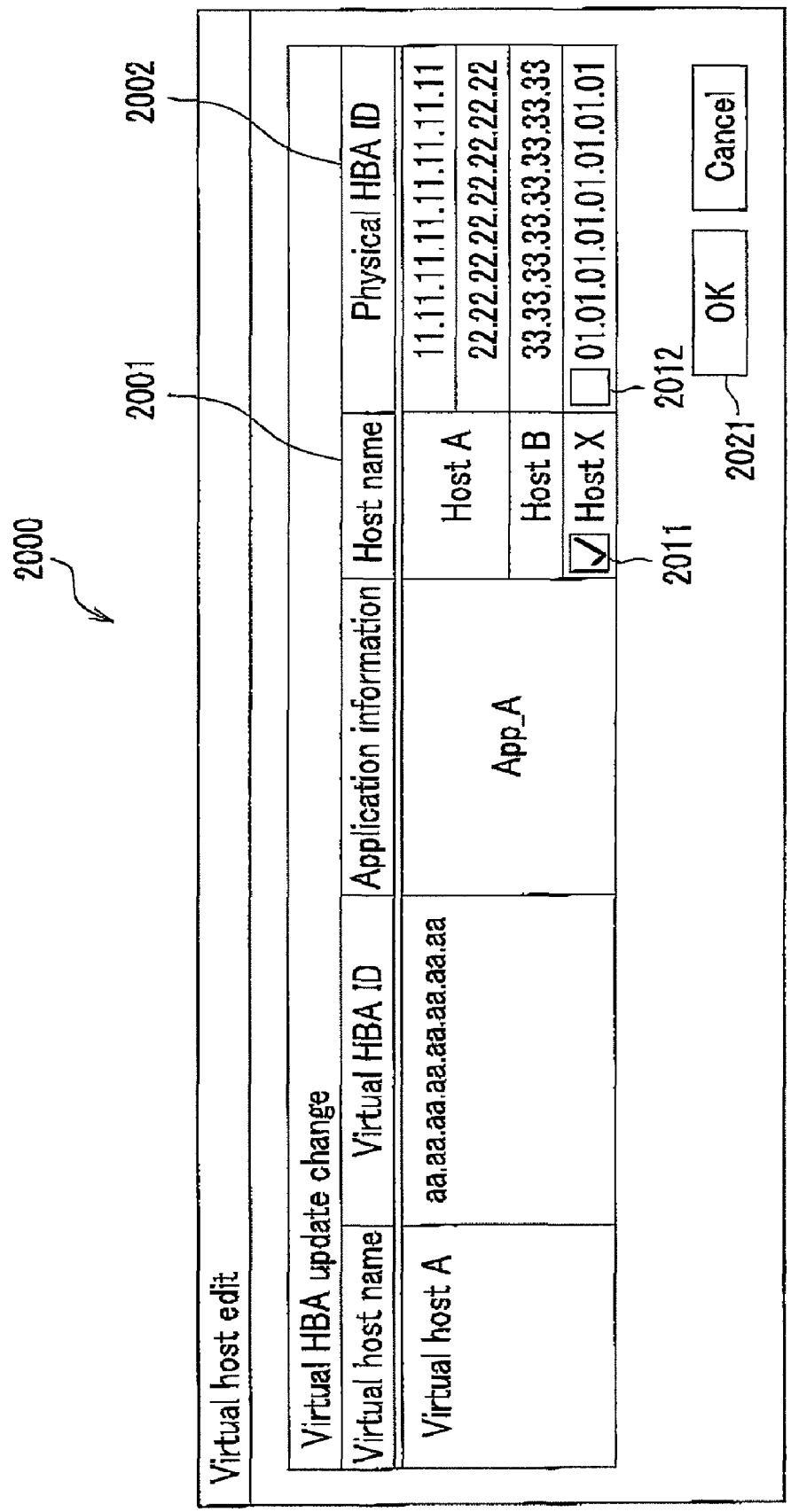
FIG. 20 is a diagram showing an example of a virtual host edit screen according to the first embodiment.
Figure 21:
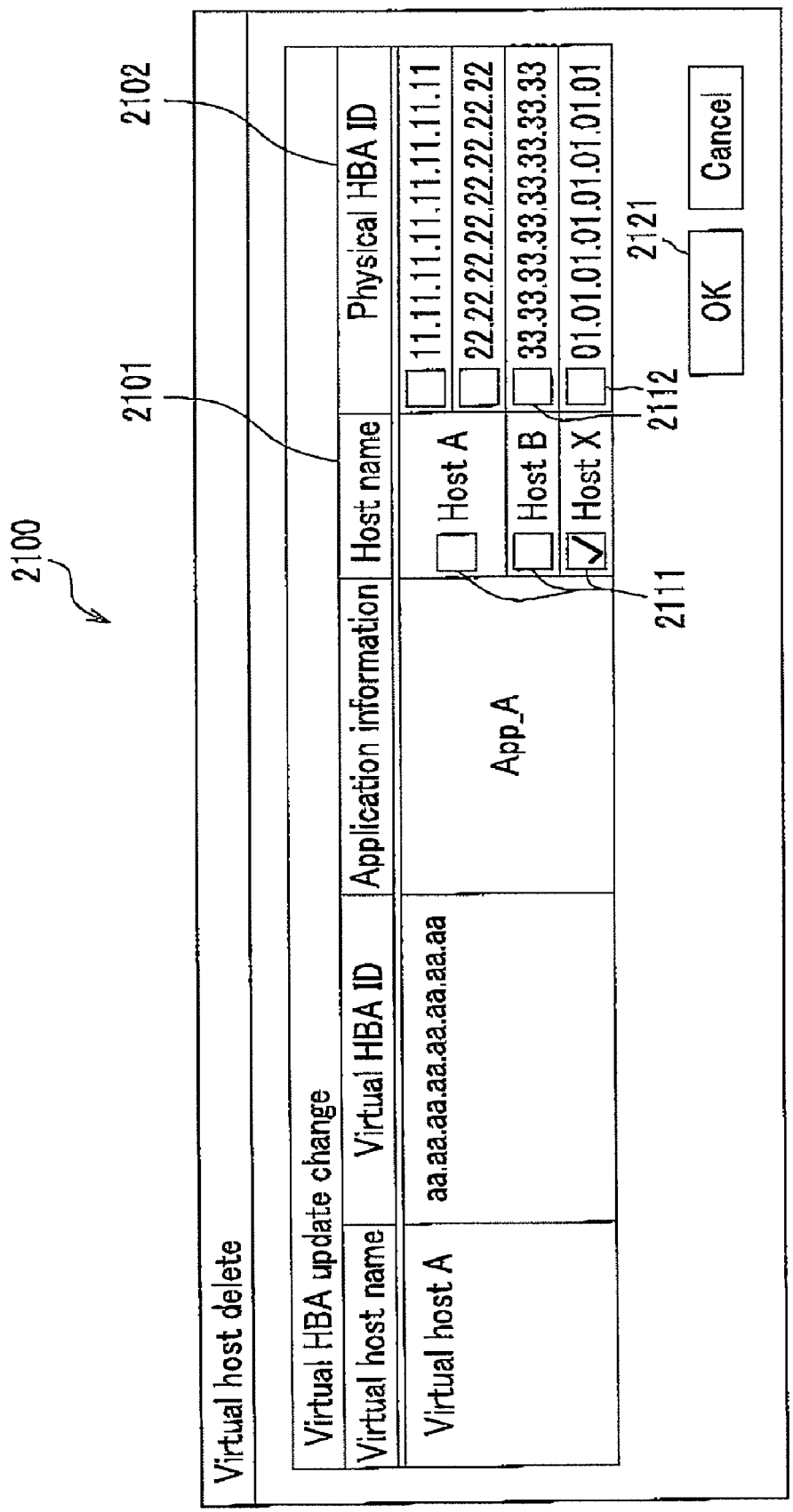
FIG. 21 is a diagram showing an example of a virtual host delete screen according to the first embodiment.

Next is described a virtual host update screen with reference to FIG. 19 to FIG. 21 as well as FIG. 1, FIG. 2, and FIG. 13 where necessary.

FIG. 19 to FIG. 21 show examples of a virtual host update screen according to the first embodiment.

Upon pressing of the update button 1304 in FIG. 13, the virtual HBA setting change program 163 obtains information on the executed work application 212, a host name, and an ID of a disposed physical HBA from the agent 211 of each real host 2 and displays the information on a virtual host update screen 1900 shown in FIG. 19. In FIG. 19, same reference numerals as those in FIG. 16 are assigned to components having similar functions, and a description thereof is omitted therefrom. The virtual host update screen 1900 of FIG. 19 is different from the virtual host setting screen 1600 of FIG. 16 in that a virtual host name display area 1901 is displayed, and that host names of newly-added real hosts 2 and physical HBA IDs disposed in the newly-added real host 2 are displayed in hatched columns 1911 to 1913.

If the user herein places a check mark in the check box 1621 and presses an update button 1921, the virtual HBA setting change program 163 updates the server virtual HBA management table 171 (see FIG. 5) and the switch virtual HBA management table 351 (see FIG. 11) according to the contents of the virtual host update screen of FIG. 19.

Settings of individual virtual hosts 7 can be made by pressing an edit button 1941 or a delete button 1942 displayed in records 1931,1932.

FIG. 20 is an example of a virtual host edit screen 2000 which is displayed by the display processing program 161 on the display device 14 in response to pressing of an edit button 1941a of a record.

On the virtual host edit screen 2000 of FIG. 20, a check box 2011 for a newly-added real host 2 and a check box 2012 are provided in a host name display area 2001 and a physical HBA ID display area 2002, respectively, to thereby select whether or not the newly-added real host 2 is registered as the virtual HBA 71. The check box 2011 in the host name display area 2001 and the check box 2012 in the physical HBA ID display area 2002 are in a hierarchical structure like the check box 1711 and the check boxes 1712a,1712b, in FIG. 17, and a description thereof is omitted. If the OK button 2011 is pressed herein, the virtual host edit screen 2000 turns back to the virtual host update screen 1900 of FIG. 19. In FIG. 19, at this time, the display processing program 161 does not display information on the newly-added real host 2 not having been marked in FIG. 20. Since the check boxes 2011,2012 are provided, an unintended real host 2 will not be registered as the virtual HBA 71, which improves security.

FIG. 21 is an example of a virtual host delete screen 2100 displayed by the display processing program 161 on the display device 14 in response to pressing of the delete button 1942 of the record 1931 in FIG. 19. In FIG. 21, same reference numerals as those in FIG. 20 are assigned to components having similar functions, and a description thereof is omitted herefrom. The virtual host delete screen 2100 of FIG. 21 is different from the virtual host edit screen 200 of FIG. 20 in that the check boxes 2111,2112 are provided not only for the newly added "HostX" but also for the existing real hosts 2 "HostA", "HostB" in the host name display area 2001 and the physical HBA ID display area 2002. If an OK button 2121 is pressed herein, the virtual host delete screen 2100 turns back to the virtual host update screen 1900 of FIG. 19. In FIG. 19, at this time, the display processing program 161 does not display information on a real host 2 or a physical HBA ID having been marked in the check boxes 2111,2112 on the virtual host delete screen 2100 of FIG. 21.

The check boxes 2111,2112 provided in FIG. 21 make it possible to delete not only the newly-added physical HBA 23 but also the existing physical HBA 23 having been registered in the virtual HBA 71, from the virtual HBA 71. This allows a flexible operation of the virtual host 7.

Note that, if a new real host 2 has not yet been added to the storage system A, the virtual host update screen 1900 of FIG. 19 does not display a host name or a physical HBA ID of the new real host 2 even after the update button 1304 of the FIG. 13 is pressed.

<<Flowcharts>>

Next is described a processing of virtual HBA management with reference to FIG. 22 to FIG. 29 as well as FIG. 1 to FIG. 21 where necessary according to the first embodiment.

<Virtual HBA Setting Processing>

Figure 22:
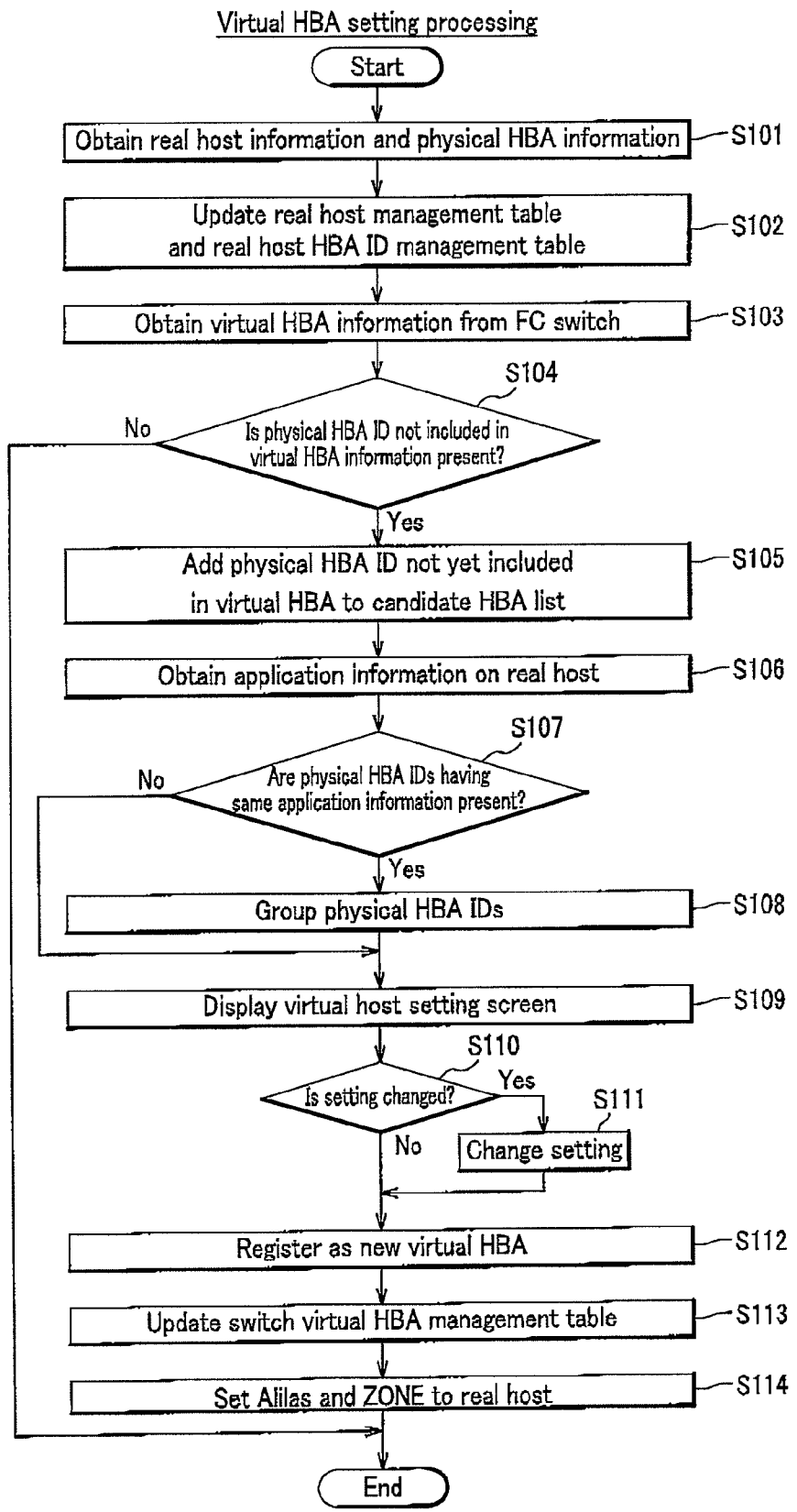
FIG. 22 is a flowchart showing a virtual HBA setting processing according to the first embodiment.

FIG. 22 is a flowchart showing a virtual HBA setting processing according to the first embodiment. The virtual HBA setting processing is a processing of setting the virtual host 7 and is performed when, after an environment of the SAN 5 is set, the real host 2, storage apparatus 4, or FC switch 3 are started, and then, the virtual HBA setting program 162 of the management server 1 is started, or before a new real host 2 is added to the storage system A. Note that, to simplify description, it is assumed herein that the programs 161 to 163, 211, 212, 321 to 323, and 451 directly perform their respective functions. Actually, however, those programs are read from the storage devices 17,35,46 or a volume (the disk 47) into the memories 16,21,32,45 such as RAMs and are then executed by the CPUs 12,22,33,44, to thereby perform their functions.

First, the virtual host management screen 1300 of FIG. 13 is displayed. The virtual host management screen 1300 does not display any information if the screen 1300 is displayed just after the storage system A has been built.

Upon pressing of the set button 1303 of FIG. 13, the virtual HBA setting program 162 requests real host information and physical HBA information from the agent 211 of each real host 2 and obtains the information (step S101). The real host information includes a host name of the real host 2, an IP address of the real host 2, an OS executed in the real host 2, and information on the work application 212. The physical HBA information includes a host name of the real host 2 and an ID of a physical HBA disposed in the real host 2.

The virtual HBA setting program 162 registers the obtained real host information and physical HBA information in appropriate sections of the real host management table 173 and real host HBA ID management table 174. This operation updates the real host management table 173 and real host HBA ID management table 174 (step S102).

The virtual HBA setting program 162 requests and obtains virtual HBA information from the FC switch 3 (step S103). The virtual HBA information includes an associated set of information made up of a virtual HBA ID, a physical HBA ID, and an FC switch name, which are obtained from the switch virtual HBA management table 351 by the setting management program 323 of the FC switch 3. Note that, when the virtual HBA setting program 162 of the management server 1 is started for the first time after an environment of the SAN 5 is set, the virtual HBA information includes only the FC switch name.

The virtual HBA setting program 162 compares the physical HBA ID included in the obtained virtual HBA information to the physical HBA ID in the real host HBA ID management table 174. The virtual HBA setting program 162 thus determines whether or not a physical HBA ID not included in the virtual HBA information is present, to thereby determine whether or not a physical HBA 23 not yet configured as the virtual HBA 71 is present (step S104). Note that, in step S104, the virtual HBA setting program 162 may compare the physical HBA ID list in the server virtual HBA management table 171 held by the management server 1 to the physical HBA ID obtained in step S101. In this case, step S103 is omitted.

If a physical HBA 23 not yet configured as the virtual HBA 71 is not determined to be present after step S104 (if "No" in step S104), that is, if all the physical HBAs 23 are included in any of the virtual HBAs 71, the virtual HBA setting program 162 terminates the processing. Note that the processing will not proceed to "No" in step S104, just after the storage system A has been built.

If a physical HBA 23 not yet configured as the virtual HBA 71 is determined to be present after step S104 (if "Yes" in step S104), the virtual HBA setting program 162 adds an ID of the physical HBA not yet included in the virtual HBA 71 to a candidate HBA list (step S105).

The virtual HBA setting program 162 obtains a host name from the real host HBA ID management table 174 using each physical HBA ID in the candidate HBA list as a key. The virtual HBA setting program 162 further obtains application information executed in a host having the obtained host name from the real host management table 173 using the obtained host name as a key (step S106). The virtual HBA setting program 162 temporarily stores the physical HBA ID and the obtained application information associated thereto, in the memory 16.

The virtual HBA setting program 162 compares the paired information made up of the physical HBA ID and the application information temporarily stored in the memory 16 for each of the physical HBA IDs. The virtual HBA setting program 162 thus determines whether or not physical HBA IDs having identical application information are present (step S107).

If physical HBA IDs having the identical application information are not determined to be present after step S107 (if "No" in step S107), the virtual HBA setting program 162 proceeds the processing to step S109.

If physical HBA IDs having the identical application information are determined to be present after step S107 (if "Yes" in step S107), the virtual HBA setting program 162 puts together and groups the physical HBA IDs for each application information (step S108). Herein, the virtual HBA setting program 162 may temporarily assign a not-yet-used WWN assigned to the FC switch 3, to the virtual HBA 71 grouped in step S108.

The display processing program 161 makes the display device 14 display the virtual host setting screen 1600 shown in FIG. 16 (step S109), to thereby supply a user with information on a creatable virtual HBA 71 and physical HBAs 23.

The display processing program 161 determines whether or not the OK button 1622 on the virtual host setting screen 1600 is pressed, to thereby determine whether or not a setting thereon is changed (step S110).

If the setting is not determined to be changed in step S110 (if "No" in step S110), that is, the OK button 1622 of FIG. 16 is pressed, the virtual HBA setting program 162 proceeds the processing to step S112.

If the setting is determined to be changed in step S110 (if "Yes" in step S110), the display processing program 161 changes the setting of the virtual HBA 71 (or the virtual host 7) (step S111). The setting of the virtual HBA 71 is changed according to the procedures described above with reference to FIG. 16 to FIG. 18.

The virtual HBA setting program 162 registers information on the virtual HBA 71 grouped in step S108 or information on the virtual HBA 71 with the setting thereof changed in step S111 as information on a new virtual HBA 71, in the server virtual HBA management table 171 (step S112). The virtual HBA ID registered herein is a virtual HBA ID which is set in a text entry box 1731 of FIG. 17. The virtual host name registered herein is a virtual host name which is set in a text entry box 1811 of FIG. 18. The physical HBA ID list registered herein is a physical HBA ID grouped in step S108. The FC switch name registered herein is an FC switch name included in the virtual HBA information obtained in step S103. The application information registered herein is application information obtained in step S106.

At this time, the switch configuration management table 175, port management table 176, or the like are updated.

After step S112, the virtual HBA setting program 162 creates the switch virtual HBA management table 351 from the server virtual HBA management table 171 with the updated information registered therein. The virtual HBA setting program 162 sends information on the created switch virtual HBA management table 351 to each FC switch 3. Note that the virtual HBA ID list and physical HBA ID list in the switch virtual HBA management table 351 are obtained from the server virtual HBA management table 171. A port ID of the FC switch 3 is obtained from the FC switch 3 when the virtual HBA information is obtained therefrom in step S103.

Upon receiving the information on the switch virtual HBA management table 351 as the information on the new virtual HBA 71, the setting management program 323 of each FC switch 3 updates the switch virtual HBA management table 351 registered in the FC switch 3 (step S113) and changes a setting of the FC switch 3 according to the updated switch virtual HBA management table 351.

The virtual HBA setting program 162 transmits information for creating an Alias and setting a ZONE to the real host 2, to the FC switch 3. Upon receiving the transmitted information, the setting management program 323 of the FC switch 3 sets the Alias and ZONE to the real host 2 (step S114).

<Real Host Addition Processing>

Figure 23:
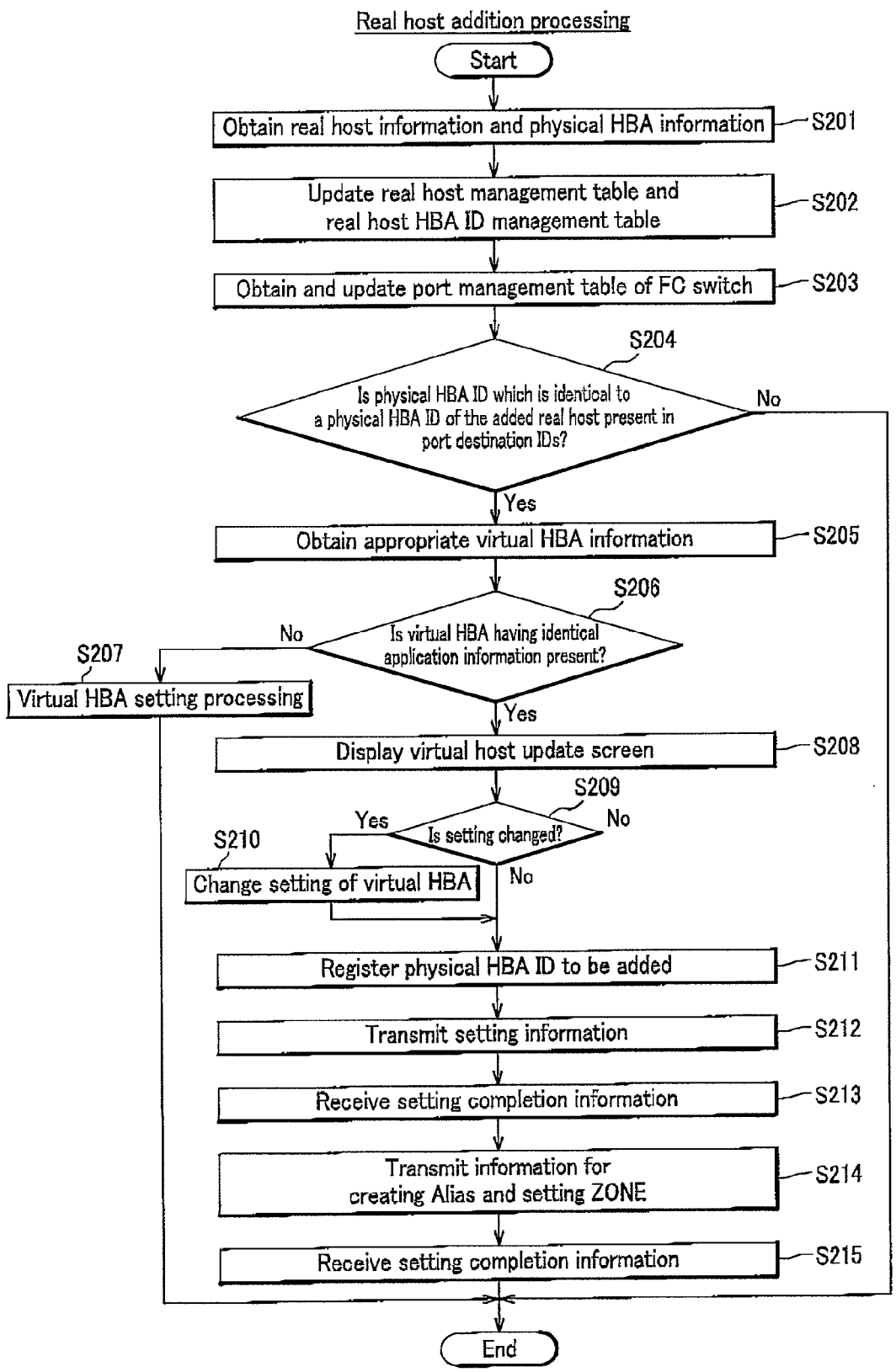
FIG. 23 is a flowchart showing a real host addition processing according to the first embodiment.

FIG. 23 is a flowchart showing a real host addition processing according to the first embodiment.

The real host addition processing is performed when a new real host 2 is added to the storage system A after the setting processing of the virtual HBA 71 (or the virtual host 7) is completed. The real host addition processing may be started after the management server 1 detects that the real host 2 is added, and the virtual HBA setting change program 163 is started. Or, the real host addition processing may be started after the real host 2 is added, the update button 1304 of FIG. 13 is pressed, and the virtual HBA setting change program 163 is started.

The virtual HBA setting change program 163 obtains real host information and physical HBA information of the added real host 2 (step S201), to thereby update the real host management table 173 and real host HBA ID management table 174 (step S202). Steps S201 and S202 are similar to steps S101 and S102 of FIG. 22 except that the information on the added real host 2 is obtained, and a detailed description thereof is thus omitted herefrom.

The virtual HBA setting change program 163 requests port information of the FC switch 3 from the FC switch 3 itself, obtains the port information from the setting management program 323 of the FC switch 3, and updates the port management table 176 (step S203). The port information includes an FC switch name, an FC switch port name, an FC switch port ID, and a destination ID of the port 31.

The virtual HBA setting change program 163 retrieves the port destination IDs in the port management table 176 and determines whether or not a physical HBA ID which is identical to the physical HBA ID of the added real host 2 obtained in step S201 is present in the port destination IDs (step S204).

If a physical HBA ID identical to the physical HBA ID of the added real host 2 is not determined to be present in the port destination IDs (if "No" in step S204), the virtual HBA setting change program 163 terminates the processing. Note that, if "No" is determined in step S204, this means that the FC switch 3 connected to the real host 2 may not be capable of transmitting information as described in step S203.

If a physical HBA ID identical to the physical HBA ID of the added real host 2 is determined to be present in the port destination IDs (if "Yes" in step S204), the virtual HBA setting change program 163 obtains virtual HBA information on the FC switch 3 of interest (step S205). More specifically, the virtual HBA setting change program 163 obtains an FC switch name having a port destination ID identical to the physical HBA ID of the added real host 2 from the port management table 176. The virtual HBA setting change program 163 obtains virtual HBA information including a virtual HBA ID, a virtual host name, a virtual HBA ID list and application information from the server virtual HBA management table 171, using the obtained FC switch name as a key.

The virtual HBA setting change program 163 compares the application information included in the virtual HBA information to the application information of which application is executed in the added real host 2 (which is obtained in step S201), to thereby determine whether or not a virtual HBA 71 having application information which is identical to the application information of which application is executed in the added real host 2 (step S206).

If a virtual HBA 71 having the identical application information is not determined to be present in step S206 (if "No" in step S206), the display processing program 161 displays the virtual host setting screen 1600 shown in FIG. 16, using the virtual HBA information or the like obtained in step S205. The display processing program 161 performs the setting processing of the virtual HBA 71 (or the virtual host 7) described above with reference to FIG. 16 to FIG. 18 in response to an input by a user via the input device 15 (step S207), and then terminates the processing.

If a virtual HBA 71 having the identical application information is determined to be present in step S206 (if "Yes" in step S206), the display processing program 161 displays the virtual host update screen 1900 as shown in FIG. 19 (step S208).

The display processing program 161 determines whether or not the edit button 1941 or the delete button 1942 on the virtual host update screen 1900 is pressed, to thereby determine whether or not a setting thereon is changed (step S209).

If the setting thereon is not determined to be changed in step S209 (if "No" in step S209), that is, the update button 1921 of FIG. 19 is pressed, the virtual HBA setting change program 163 proceeds the processing to the step S211.

If the setting thereon is determined to be changed in step S209 (if "Yes" in step S209), the display processing program 161 changes the setting of the virtual HBA as described above with reference to FIG. 19 to FIG. 21 (step S210). After that, the virtual HBA setting change program 163 proceeds the processing to step S211.

After step S209 or step S210, the virtual HBA setting change program 163 registers a physical HBA ID to be added, to the updated information on the virtual HBA 71 (step S211). More specifically, the virtual HBA setting change program 163 registers a physical HBA ID to be added, to the physical HBA ID list of the appropriate virtual HBA 71 in the server virtual HBA management table 171.

The virtual HBA setting change program 163 transmits to the appropriate FC switch 3, setting information which requests to add information on the real host 2 to be added to the switch virtual HBA management table 351 of the FC switch 3 (step S212). The setting information includes the virtual HBA ID of which setting has been changed and the physical HBA ID of the added to the real host 2, which are associated with each other.

Upon receiving the setting information, the setting management program 323 of the FC switch 3 retrieves the switch virtual HBA management table 351, using the virtual HBA ID included in the setting information as a key, and adds the physical HBA ID included in the setting information to the appropriate physical HBA ID list. The transmission/reception processing program 322 of the FC switch 3 transmits information indicating that the setting is completed to the management server 1. Upon receiving the setting completion information by the management server 1 (step S213), the virtual HBA setting change program 163 transmits the information for creating an Alias and setting a ZONE to the real host 2, to the FC switch 3 (step S214).

Upon receiving the transmitted information, the setting management program 323 of the FC switch 3 creates the Alias and sets the ZONE to the real host 2. The transmission/reception processing program 322 then transmits setting completion information to the management server 1. Upon receiving the setting completion information by the management server 1 (step S215), the virtual HBA setting change program 163 terminates the processing.

<Virtual Host Management Screen Displaying Processing>

Figure 24:
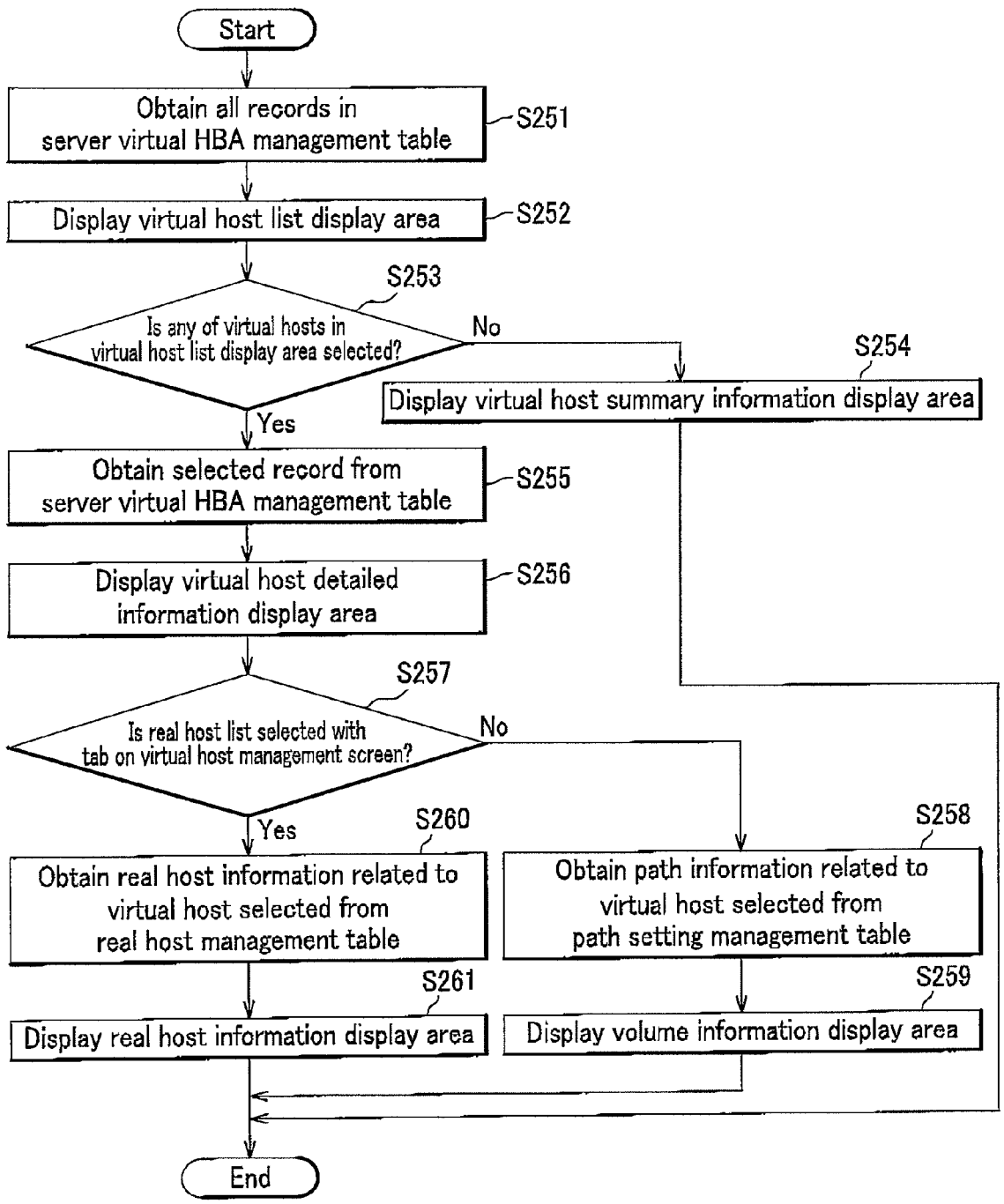
FIG. 24 is a flowchart showing a virtual host management screen displaying processing according to the first embodiment.

Next is described a virtual host management screen displaying processing with reference to FIG. 24 as well as FIG. 2 and FIG. 13 to FIG. 15 where necessary.

FIG. 24 is a flowchart showing the virtual host management screen displaying processing according to the first embodiment.

In response to an input of a request of displaying the virtual host management screen 1300 by a user, the display processing program 161 obtains all records in the server virtual HBA management table 171 (step S251).

The display processing program 161 makes the display device 14 display the virtual host list display area in which selectable virtual hosts are displayed, based on the obtained records (step S252).

The display processing program 161 determines whether or not the user selects any of the virtual hosts in the displayed virtual host list display area 1301 (step S253).

If any of the virtual hosts is not determined to be selected in step S253 (if "No" in step S253), the display processing program 161 displays the virtual host summary information display area 1302 (step S254). More specifically, the display processing program 161 obtains a virtual HBA ID, a virtual host name corresponding to the virtual HBA ID, a physical HBA ID list, and application information from the records obtained in step S251. The display processing program 161 retrieves the security physical HBA ID list in the path setting management table 172 (see FIG. 6) using the physical HBA ID registered in the obtained physical HBA ID list as a key and identifies an appropriate record in the path setting management table 172. The display processing program 161 obtains a capacity of a volume (or volume information) of the storage apparatus 4 from the record. The display processing program 161 makes the display device 14 display the obtained volume capacity, virtual HBA ID, and application information in the virtual host summary information display area 1302. After step S254, the display processing program 161 terminates the processing.

If any of the virtual hosts is determined to be selected in step S253 (if "Yes" in step S253), the display processing program 161 obtains a record corresponding to the virtual host selected from the server virtual HBA management table 171, using the selected virtual host name as a key (step S255).

The display processing program 161 makes the display device 14 display the virtual host detailed information display area 1410 (step S256). At this time, the virtual host detailed information display area 1410 may or may not display information similar to the information on a record of the selected virtual host from the virtual host summary information display area 1302 of FIG. 13. Also at this time, the volume information display area 1403 and real host information display area 1405 do not display any information.

The display processing program 161 determines whether or not a real host list is selected with a tab (see a tab 1404 in FIG. 14) on the currently-displayed virtual host management screen 1300 (step S257).

If the real host list is determined to be selected in step S257 (if "No" in step S257), the display processing program 161 obtains path information related to the virtual host selected from the path setting management table 172 (see FIG. 6) (step S258). More specifically, the display processing program 161 obtains the path information including a virtual HBA ID, a virtual host name corresponding to the virtual HBA ID, a physical HBA ID list, and application information, from the server virtual HBA management table 171. The display processing program 161 retrieves the security physical HBA ID list in the path setting management table 172 (see FIG. 6), using the physical HBA ID registered in the obtained physical HBA ID list as a key and identifies an appropriate record in the path setting management table 172. The display processing program 161 obtains the identified record as the path information.

The display processing program 161 makes the display device 14 display the obtained path information as the volume information display area 1403 (step S259) and terminates the processing.

If the real host list is determined to be selected in step S257 (if "Yes" in step S257), the display processing program 161 obtains real host information related to the virtual host selected in step S253, from the real host management table 173 (see FIG. 7) (step S260). More specifically, the display processing program 161 identifies an appropriate record in the real host management table 173 (see FIG. 7) using each physical HBA ID in the physical HBA ID list in the server virtual HBA management table 171 (see FIG. 5) as a key. The display processing program 161 obtains the identified record as the real host information.

The display processing program 161 makes the display device 14 display the obtained real host information in the real host information display area 1405 (step S261) and terminates the processing.

Note that the processing shown in FIG. 24 is an example and is not limited to the aforementioned. The display processing program 161 may display the virtual host management screen 1300 using, for example, the procedures described above with reference to FIG. 13 to FIG. 15.

<I/O Management Processing>

Next is described an I/O management processing with reference to FIG. 25 to FIG. 30 as well as FIG. 1 to FIG. 4 and FIG. 11 where necessary. In the I/O management processing, data is read or written in a volume of the storage apparatus 4 from the real host 2 via the FC switch 3.

First, a write processing for writing data from the real host 2 into the storage apparatus 4 is described with reference to FIG. 25 to FIG. 27. Then, a read processing for reading data from the real host 2 to the storage apparatus 4 is described with reference to FIG. 28 to FIG. 30.

<Write Processing at Real Host>

Figure 25:
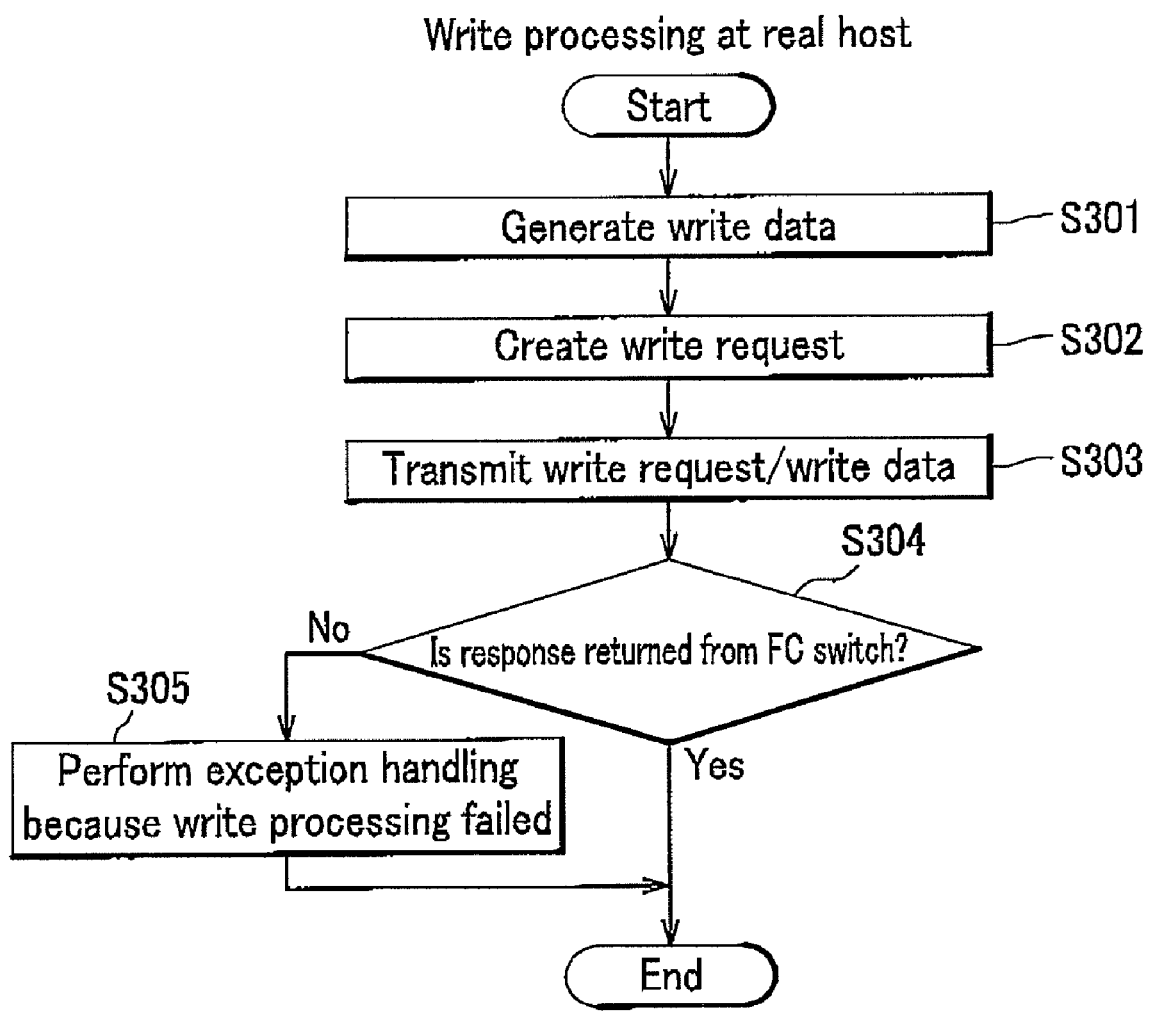
FIG. 25 is a flowchart showing a write processing at the real host according to the first embodiment.

FIG. 25 is a flowchart showing the write processing at the real host 2 according to the first embodiment.

The work application 212 of the real host 2 generates a write data which is a data to be written in the storage apparatus 4 (step S301).

The work application 212 creates a write request (step S302). The write request includes a physical HBA ID corresponding to the port 31 of the FC switch 3 tied to a volume of the storage apparatus 4 as a destination (which may also be referred to as an originating physical HBA ID), a port ID of the storage apparatus 4 as the destination, an exchange ID, an ID of a volume in which the write data is written.

The work application 212 transmits the created write request and the write data as paired information (a write request/write data) to the FC switch 3 (step S303).

The work application 212 determines whether or not a response to the transmitted write request/write data is returned from the FC switch 3 (step S304).

If a response is determined to be returned in step S304, (if "Yes" in step S304), the work application 212 terminates the processing.

If a response is not determined to be returned in step S304, for example, there is no response returned after a prespecified period of time has elapsed, or error information is returned (if "No" in step S304), the work application 212 performs exception handling such as an error display because the write processing has failed" (step S305).

<Write Processing at FC Switch>

Figure 26:
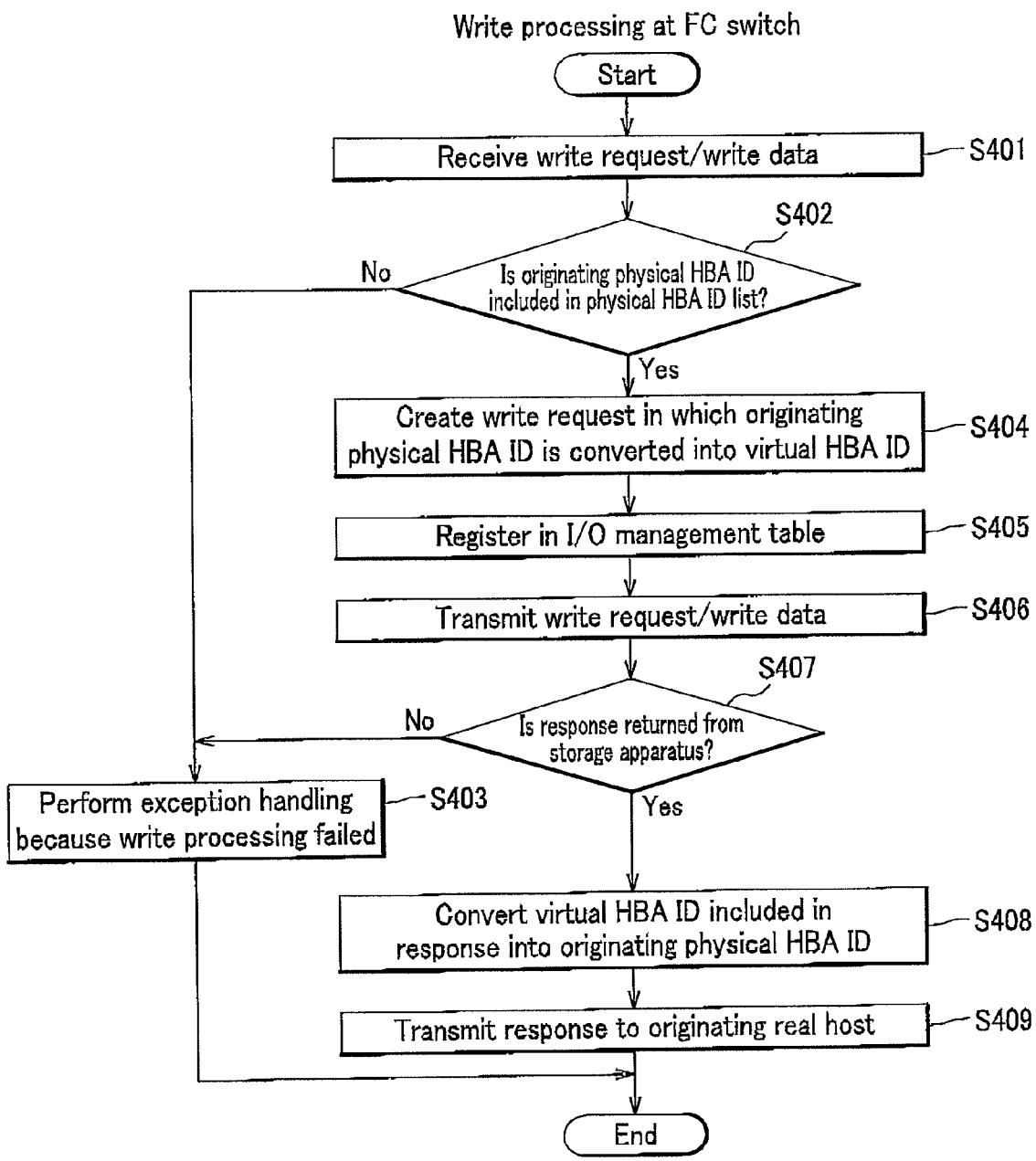
FIG. 26 is a flowchart showing a write processing at the FC switch according to the first embodiment.

FIG. 26 is a flowchart showing the write processing at the FC switch 3 according to the first embodiment.

The transmission/reception processing program 322 of the FC switch 3 receives the write request/write data transmitted from the real host 2 (step S401).

The ID conversion program 321 of the FC switch 3 determines whether or not a physical HBA ID included in the received write request is included in the physical HBA ID list in the switch virtual HBA management table 351 (step S402).

If the originating physical HBA ID is not determined to be included in the physical HBA ID list in step S402 (if "No" in step S402), the transmission/reception processing program 322 performs exception handling such as a transmission of error information to the originating real host 2 because the write processing has failed (step S403). After that, the transmission/reception processing program 322 terminates the processing.

If the originating physical HBA ID is determined to be included in the physical HBA ID list in step S402 (if "Yes" in step S402), the ID conversion program 321 obtains a virtual HBA ID corresponding to the physical HBA ID list from the switch virtual HBA management table 351 and creates a write request in which the originating physical HBA ID is converted into the obtained virtual HBA ID (step S404).

The ID conversion program 321 registers information such as the converted originating physical HBA ID and the virtual HBA ID into the I/O management table 352 (step S405). The information registered into the I/O management table 352 also includes a port ID of a destination storage apparatus 4 included in the write request and an exchange ID.

The transmission/reception processing program 322 transmits the write request in which the physical HBA ID is converted into the virtual HBA ID in step S404 and the write data received in step S401 as paired information (a write request/write data) to the storage apparatus 4 (step S406).

The transmission/reception processing program 322 determines whether or not a response to the transmitted write request/write data is returned from the storage apparatus 4 (step S407). The response to be returned from the storage apparatus 4 includes an exchange ID and a virtual HBA ID written in the write request.

If a response is not determined to be returned in step S407, for example, there is no response returned after a prespecified period of time has elapsed, or error information is returned (if "No" in step S407), the transmission/reception processing program 322 performs the exception handling described in step S403.

If a response is determined to be returned in step S407 (if "Yes" in step S407), the ID conversion program 321 references the I/O management table 352 and converts a virtual HBA ID included in the response into the originating physical HBA ID (step S408). More specifically, the ID conversion program 321 retrieves the I/O management table 352 using the exchange ID included in the response as a key, to thereby obtain appropriate virtual HBA ID and physical HBA ID.

Then the ID conversion program 321 converts the virtual HBA ID included in the response into the obtained physical HBA ID.

The transmission/reception processing program 322 transmits the response in which the virtual HBA ID is converted into the physical HBA ID in step S408, to the originating real host 2 (step S409). That is, the transmission/reception processing program 322 transmits the response to the physical HBA ID included therein.

<Write Processing at Storage Device>

Figure 27:
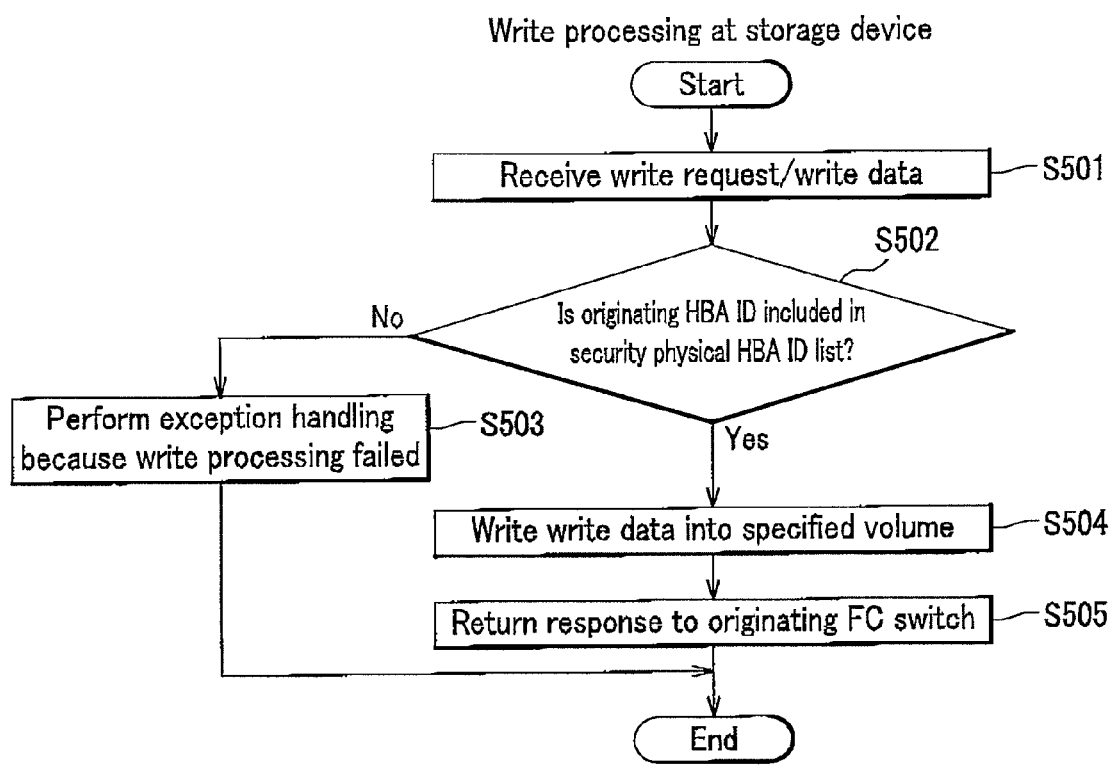
FIG. 27 is a flowchart showing a write processing at the storage apparatus according to the first embodiment.

FIG. 27 is a flowchart showing the write processing at the storage apparatus 4 according to the first embodiment.

The controller 451 of the storage apparatus 4 receives the write request/write data from the FC switch 3 (step S501). The controller 451 references the security physical HBA ID list in the path setting management table 461 of the storage device 46 using the volume ID included in the write request as a key and determines whether or not the originating HBA ID included in the write request is included in the security physical HBA ID list (step S502). Note that the originating HBA ID in step S502 is herein the converted virtual HBA ID.

If the originating HBA ID is not determined to be included in the security physical HBA ID list in step S502 (if "No" in step S502), the controller 451 performs exception handling such as a transmission of error information to the FC switch 3 because the write processing has failed (step S503).

If the originating HBA ID is determined to be included in the security physical HBA ID list in step S502 (if "Yes" in step S502), the controller 451 writes the write data into a volume specified by the volume ID included in the write request (step S504).

The controller 451 returns a response with the originating virtual HBA ID as a destination to the originating FC switch 3 (step S505).

<Read Processing at Real Host>

Figure 28:
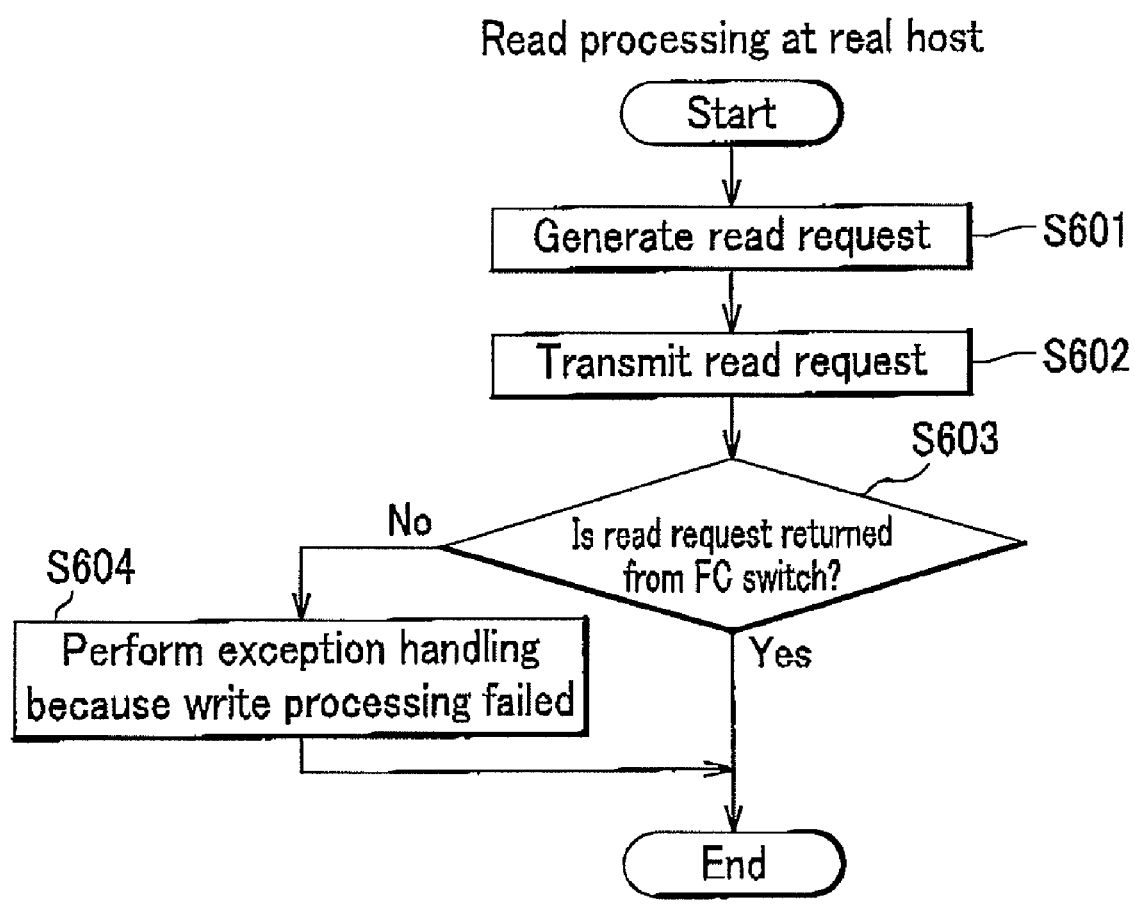
FIG. 28 is a flowchart showing a read processing at the real host according to the first embodiment.

FIG. 28 is a flowchart showing the read processing at the real host 2 according to the first embodiment.

The work application 212 of the real host 2 creates a read request (step S601) and transmits the created read request to the FC switch 3 (step S602). The read request includes a physical HBA ID (which may also be referred to as an originating physical HBA ID) corresponding to the port 31 of the FC switch 3 tied to a volume in the storage apparatus 4 as a destination, a port ID of the destination storage apparatus 4, an exchange ID, and an ID of a volume in which a read data is read.

The work application 212 determines whether or not a read data in response to the read request is returned from the FC switch 3 (step S603).

If the read data is determined to be returned in step S603 (if "Yes" in step S603), the work application 212 processes the returned read data and terminates the processing.

If the read data is not determined to be returned in step S603, for example, there is no response returned after a prespecified period of time has elapsed, or error information is returned (if "No" in step S603), the work application 212 performs exception handling such as an error display because the write processing has failed (step S604).

<Read Processing at FC Switch>

Figure 29:
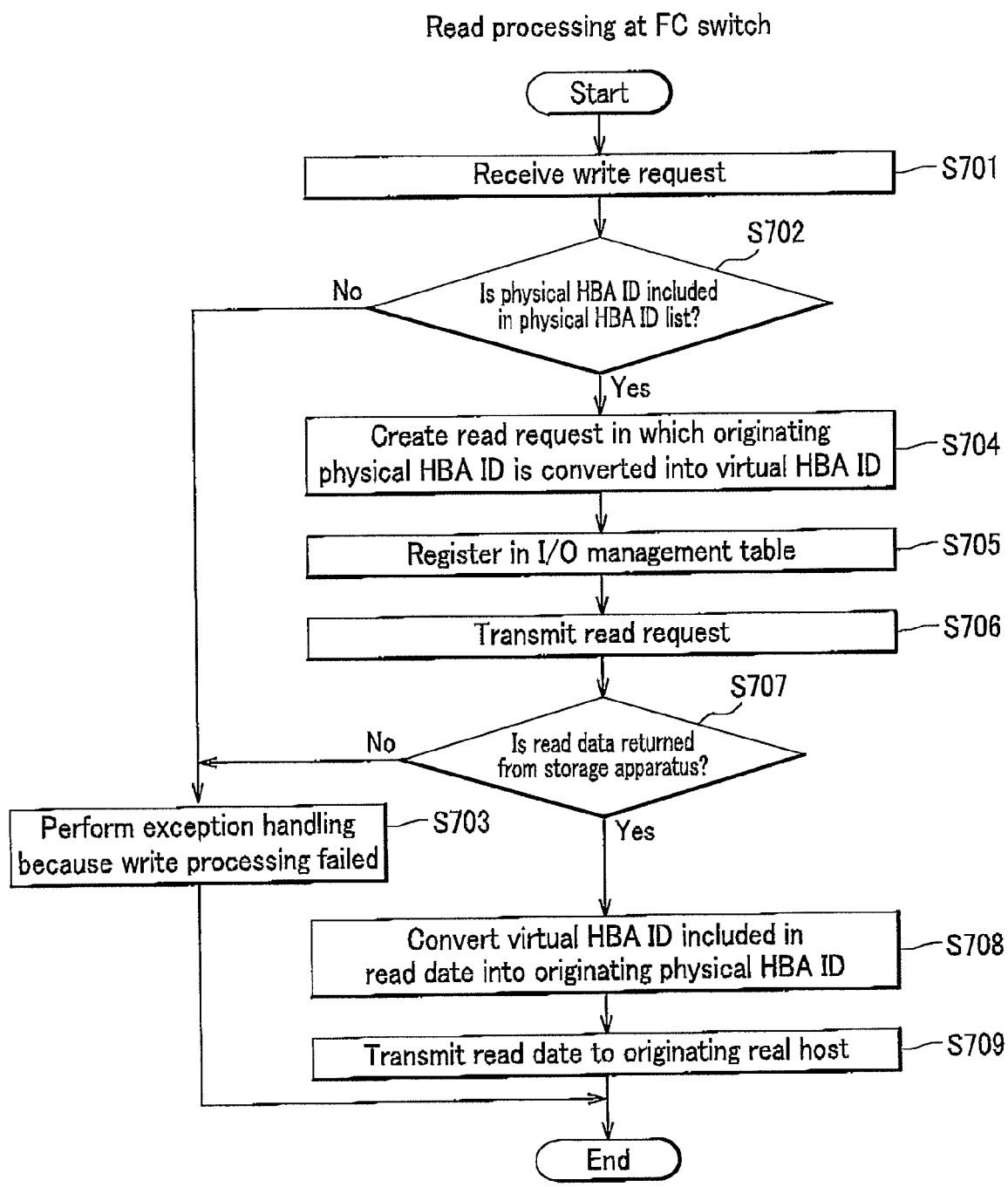
FIG. 29 is a flowchart showing a read processing at the FC switch according to the first embodiment.

FIG. 29 is a flowchart showing the read processing at the FC switch 3 according to the first embodiment.

The transmission/reception processing program 322 of the FC switch 3 receives the read request transmitted from the real host 2 (step S701).

The ID conversion program 321 of the FC switch 3 determines whether or not a physical HBA ID included in the received read request is Included in the physical HBA ID list in the switch virtual HBA management table 351 (step S702).

If the originating physical HBA ID is not determined to be included in the physical HBA ID list in step S702 (if "No" in step S702), the transmission/reception processing program 322 performs exception handling such as a transmission of error information to the originating real host 2 because the write processing has failed (step S703) and terminates the processing.

If the originating physical HBA ID is determined to be included in the physical HBA ID list in step S702 (if "Yes" in step S702), the ID conversion program 321 obtains a virtual HBA ID corresponding to the physical HBA ID list from the switch virtual HBA management table 351 and creates a read request in which the originating physical HBA ID is converted into the obtained virtual HBA ID (step S704).

The ID conversion program 321 registers the converted originating physical HBA ID, the virtual HBA ID, and other information, in the I/O management table 352 (step S705). The information registered in the I/O management table 352 also includes a port ID of the destination storage apparatus 4 included in the read request and an exchange ID.

The transmission/reception processing program 322 transmits the read request in which the physical HBA ID is converted into the virtual HBA ID in step S704, to the storage apparatus 4 (step S706).

The transmission/reception processing program 322 determines whether or not a read data in response to the transmitted read request is returned from the storage apparatus 4 (step S707).

If the read data is not determined to be returned in step S707, for example, there is no response returned after a pre-specified period of time has elapsed, or error information is returned (if "No" in step S707), the transmission/reception processing program 322 performs the exception handling described in step S703.

If the read data is determined to be returned in step S707 (if "Yes" in step S707), the ID conversion program 321 references the I/O management table 352 and converts the virtual HBA ID included in the read data into the originating physical HBA ID (step S708). More specifically, the ID conversion program 321 retrieves the I/O management table 352 using the exchange ID included in the read data as a key and obtains an appropriate virtual HBA ID and physical HBA ID. The ID conversion program 321 converts the virtual HBA ID included in the read data into the obtained physical HBA ID.

The transmission/reception processing program 322 transmits the read data in which the virtual HBA ID is converted into the physical HBA ID in step S708, to the originating real host 2 (step S709). That is, the transmission/reception processing program 322 transmits the read data to the physical HBA ID included therein.

<Read Processing at Storage Device>

Figure 30:
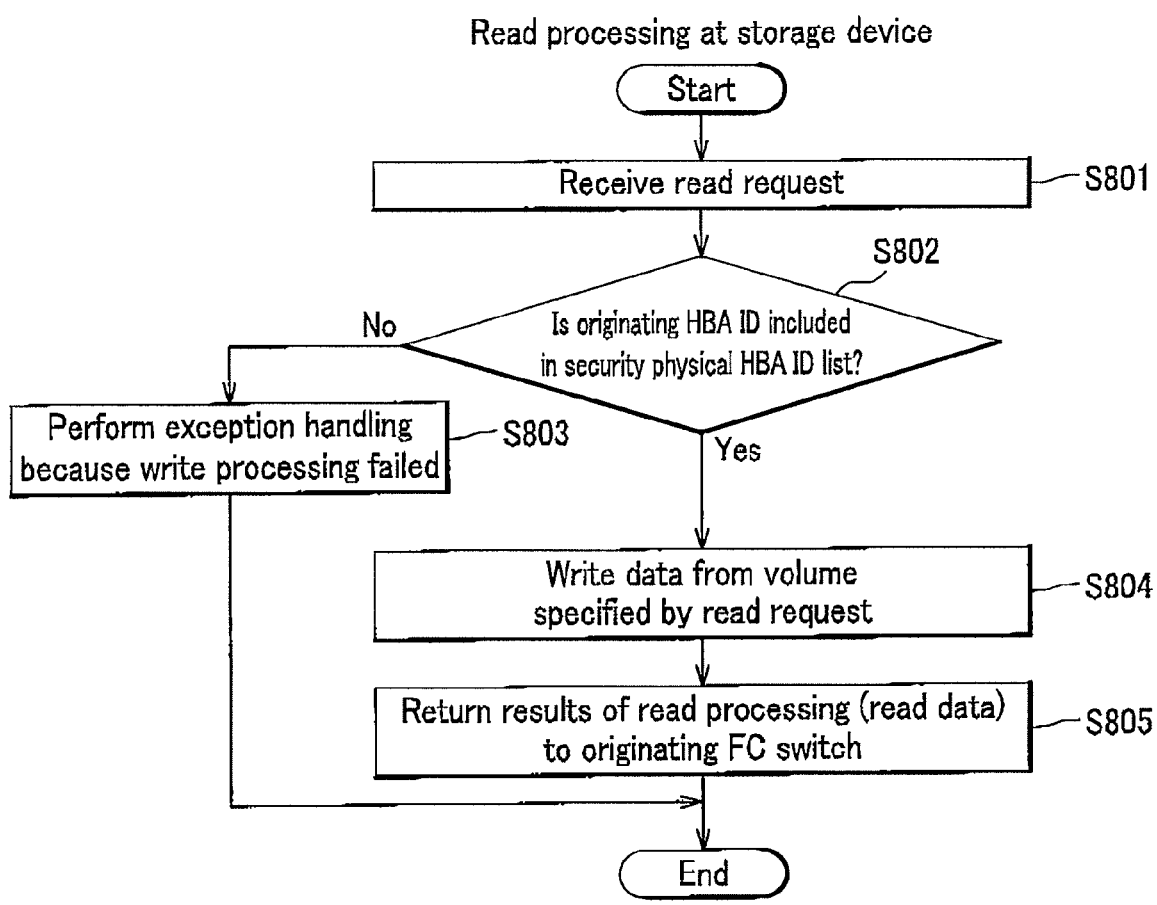
FIG. 30 is a flowchart showing a read processing at the storage apparatus according to the first embodiment.

FIG. 30 is a flowchart showing the read processing at the storage device 4 according to the first embodiment.

The controller 451 of the storage apparatus 4 receives the read request from the FC switch 3 (step S801). The controller 451 references security physical HBA ID list in the path setting management table 461 of the storage device 46, using the volume ID included in the read request as a key and determines whether or not the originating HBA ID included in the read request is included in the security physical HBA ID list (step S802). The originating HBA ID is herein the converted virtual HBA ID.

If the originating HBA ID is not determined to be included in the security physical HBA ID list in step S802 (if "No" in step S802), the controller 451 performs exception handling such as a transmission of error information to the FC switch 3 because the write processing has failed (step S803).

If the originating HBA ID is determined to be included in the security physical HBA ID list in step S802 (if "Yes" in step S802), the controller 451 reads a data from a volume specified by the volume ID included in the read request (step S804).

The controller 451 returns results of the read processing (a read data) in which the originating virtual HBA ID is a destination, to the originating FC switch 3 (step S805).

<Advantages of First Embodiment>

In the first embodiment, the virtual HBA 71 in which physical HBA IDs are grouped for each work application 212 is set. This eliminates a need of individually managing the physical HBAs 23 and reduces a user's burden of the management. As described with reference to FIG. 13 to FIG. 21, a display of information on the virtual HBA 71 (or the virtual host 7) on a screen makes it easy to manage the physical HBA 23. As described with reference to FIG. 16 to FIG. 21, a user can select the physical HBA 23 which may be managed as the virtual HBA 71. This can prevent an unintended physical HBA 23 (that is, an unintended real host 2) from being added to the virtual HBA 71, thus improving security.

[Second Embodiment]

Next is described a second embodiment according to the present invention with reference to FIG. 31 to FIG. 37. In the second embodiment, a management server 1a issues a temporary virtual HBA ID which cannot exist in reality, associates the temporary virtual HBA ID with application information, and stores the temporary virtual HBA ID associated with a physical HBA ID as security information of a volume, in a storage device 17a. If a new real host 2 is added to a storage system B, the management server 1a identifies the temporary virtual HBA 71 to which the physical HBA 23 disposed in the real host 2 should be associated, based on information on the work application 212 executed in the real host 2. The management server 1a stores the physical HBA ID to be added with which the temporary virtual HBA 71 is associated, in the security information of the volume. This eliminates a need for changing a setting of a configuration of the storage apparatus 4, which otherwise accompanies the addition of the real host 2.

<System Configuration>

Figure 31:
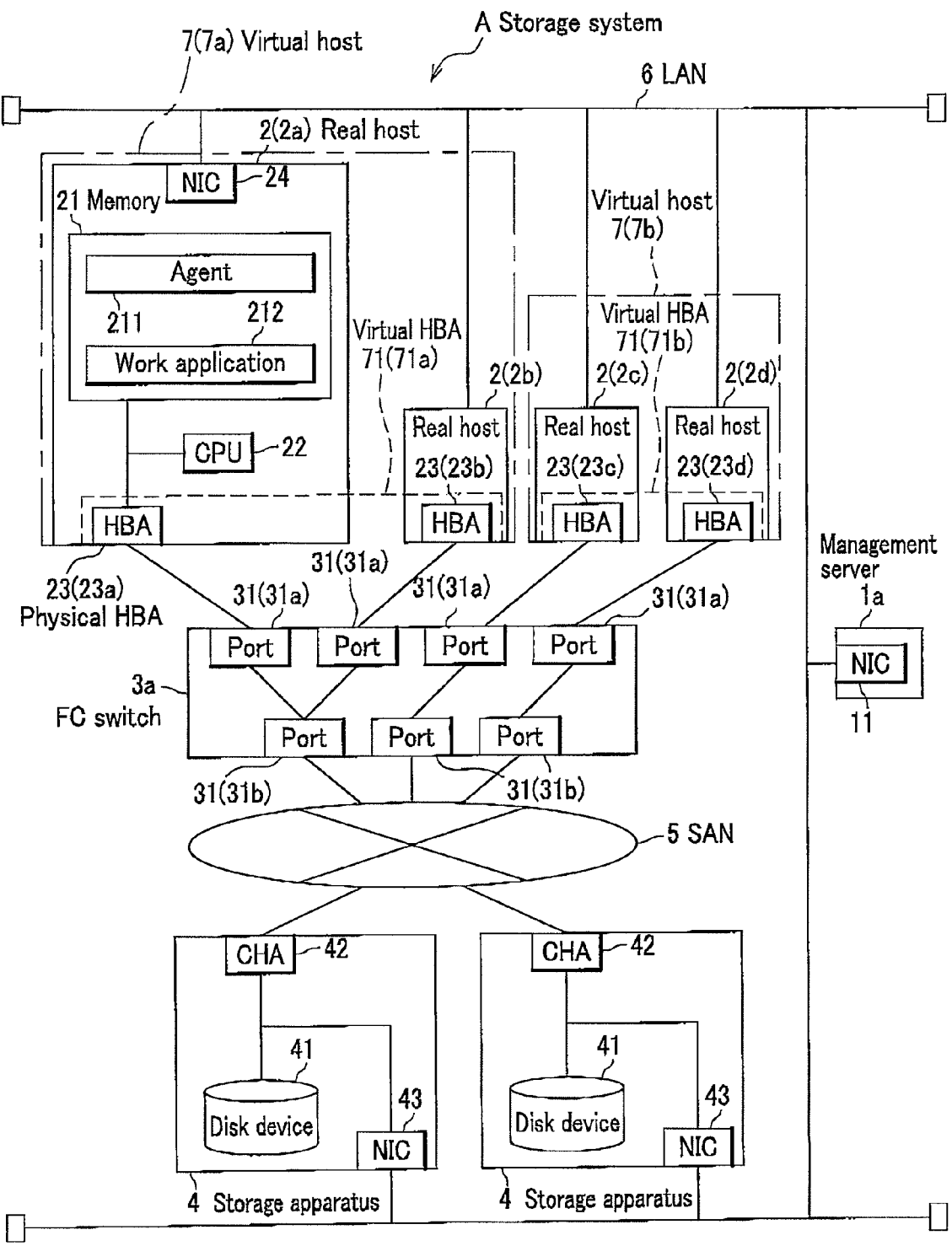
FIG. 31 is a diagram showing an example of a configuration of a storage system according to a second embodiment.

FIG. 31 shows an example of a configuration of the storage system B according to a second embodiment.

In FIG. 31, same reference numerals as those in FIG. 1 are S assigned to components having similar functions, and a description thereof is omitted herefrom.

The storage system B of FIG. 31 is different from the storage system A of FIG. 1 in that the storage system B has the management server 1a for managing the virtual HBA 71 and an FC switch 3a having a generally-used structure.

<Management Server>

Figure 32:
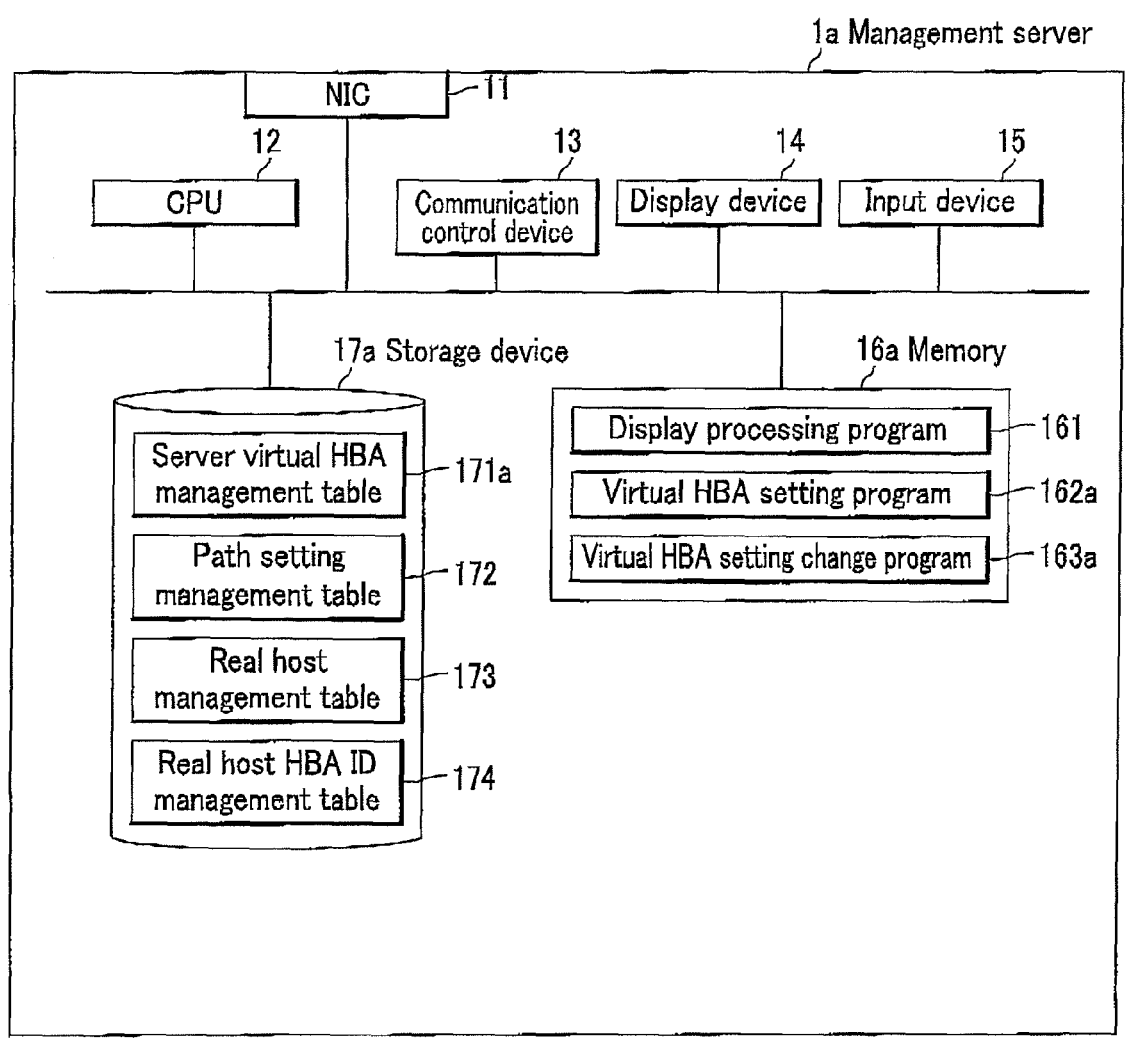
FIG. 32 is a diagram showing an example of a hardware configuration of a management server according to the second embodiment.

FIG. 32 shows an example of a hardware configuration of the management server 1a according to the second embodiment.

In FIG. 32, same reference numerals as those in FIG. 2 are assigned to components having similar functions, and a description thereof is omitted herefrom.

The management server 1a in the storage system B of FIG. 32 is different from the management server 1 in the storage system A of FIG. 2 in that the management server 1a has a virtual HBA management table 171a, instead of the server virtual HBA management table 171, of a storage device 17a and omits the switch configuration management table 175 and port management table 176. The management server 1a will be described later with reference to FIG. 33.

Further, in this embodiment, a memory 16a includes the display processing program 161, a virtual HBA setting program 162a, a virtual HBA setting change program 163a for performing processings to be described later with reference to FIG. 34 to FIG. 37. The programs 161,162a,163a are developed from the storage device 17a and are executed by the CPU 12, to thereby realize respective functions.

<<Tables>>

<Virtual HBA Management Table>

FIG. 33 is a flowchart showing the virtual HBA management table 171a according to the second embodiment.

The virtual HBA management table 171a is a table stored in the storage device 17a of the management server 1a as described above and stores therein information on the virtual HBA 71 and information on the work application 212, which are associated with each other.

More specifically, the virtual HBA management table 171a stores therein a record number, a virtual HBA ID, a virtual host name, and application information.

In the second embodiment, the virtual HBA ID does not exist in reality and is issued in WWN format by the management server 1a.

The virtual HBA ID and virtual host name are information registered by a user on the virtual host setting screen 1600 or the like via the input device 15 as described with reference to FIG. 13 to FIG. 21.

The application information includes information such as an application name which is a reference of grouping for setting the virtual HBA 71.

The real host management table 173 and real host HBA ID management table 174 in this embodiment have configurations similar to those shown in FIG. 7 and FIG. 8, respectively, and a description thereof is omitted herefrom. The path setting management table 172 has a configuration similar to that shown in FIG. 6. However, in this embodiment, a physical HBA ID and the virtual HBA 71 may be registered in the security physical HBA ID list.

<<Flowchart>>

Next are described a virtual HBA management processing according to the second embodiment with reference to FIG. 34 to FIG. 37 as well as FIG. 31 to FIG. 33 and FIG. 6 to FIG. 8 where necessary.

<Virtual HBA Setting and Security Registering Processing>

Figure 34:
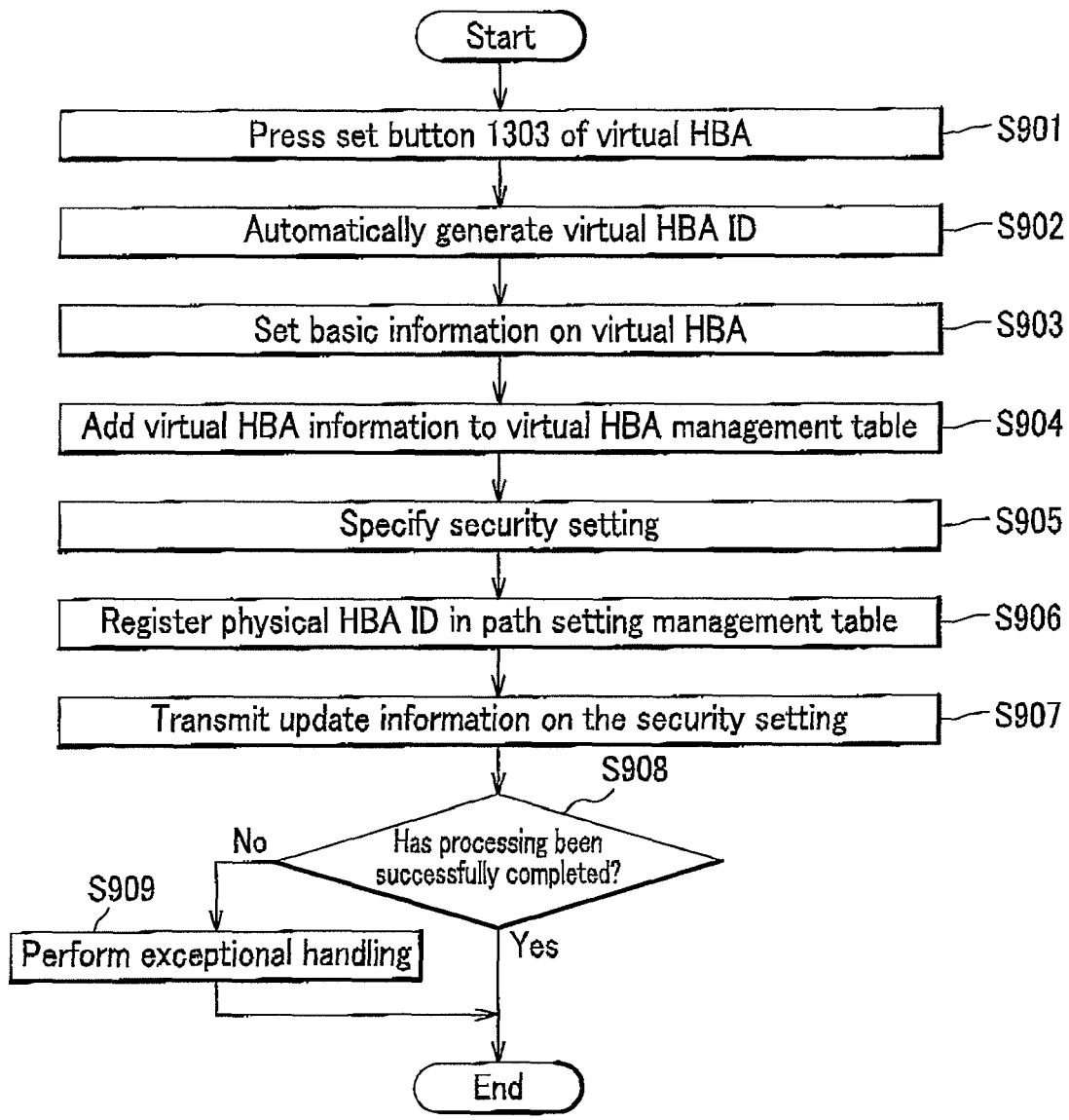
FIG. 34 is a flowchart showing a virtual HBA setting and security registering processing according to the second embodiment.

FIG. 34 is a flowchart showing the virtual HBA setting and security registering processing according to the second embodiment.

The display processing program 161 makes the display device 14 display the virtual host management screen 1300 shown in FIG. 13. A user presses the set button 1303 of the virtual HBA 71 (step S901). At this time, the virtual host list display area 1301 and the virtual host summary information display area 1302 of the virtual host management screen 1300 do not display any information.

The virtual HBA setting program 162a automatically generates a virtual HBA ID (step S902). As described above, the auto-generated virtual HBA ID is an HBA ID in WWN format which cannot exist in reality.

The display processing program 161 makes the display device 14 display a virtual HBA information setting screen (not shown) and sets basic information on the virtual HBA 71 which the user may want to set via the input device 15 (step S903). The set basic information of the virtual HBA 71 includes a virtual host name, application information, and OS information.

The virtual HBA setting program 162a adds a record for inputting therein information on the virtual HBA 71 to be created, to the virtual HBA management table 171a of FIG. 33. Then the virtual HBA setting program 162a adds virtual HBA information including the virtual HBA ID auto-generated in step S902, and the virtual host name and application information set in step S903, to the record (step S904).

The display processing program 161 makes the display device 14 a security setting screen (not shown), and the user specifies a security setting via the input device 15 (step S905). More specifically, the user selects a volume in which the user wants to make the security setting on the security setting screen (not shown), according to which information such as a storage name and a volume ID is registered in the path setting management table 172 held in the management server 1.

The virtual HBA setting program 162a registers the virtual HBA ID auto-generated in step S902, in a security physical HBA ID list in the path setting management table 172 in which the security setting is made in step S905 (step S906). At this time, an HBA ID stored in the security physical HBA ID list is only a virtual HBA ID.

The virtual HBA setting program 162a transmits update information on the security setting to the storage apparatus 4 assigned to the virtual HBA 71 to be created (step S907). The transmitted update information on the security setting includes the auto-generated virtual HBA ID.

Upon receiving the update information on the security setting, the storage apparatus 4 performs a processing to be described later with reference to FIG. 35 and transmits information on results of the security setting to the storage apparatus 4.

The virtual HBA setting program 162a determines whether or not the information on results of the setting transmitted from the storage apparatus 4 shows that the processing has been successfully completed (step S908).

If the processing is determined to have been successfully completed in step S908 (if "Yes" in step S908), the virtual HBA setting program 162a terminates the processing.

If the processing is not determined to have been successfully completed in step S908 (if "No" in step S908), the virtual HBA setting program 162a performs exceptional handling such as a error display (step S909) and terminates the processing.

<Virtual HBA ID Register Processing at Storage Device>

Figure 35:
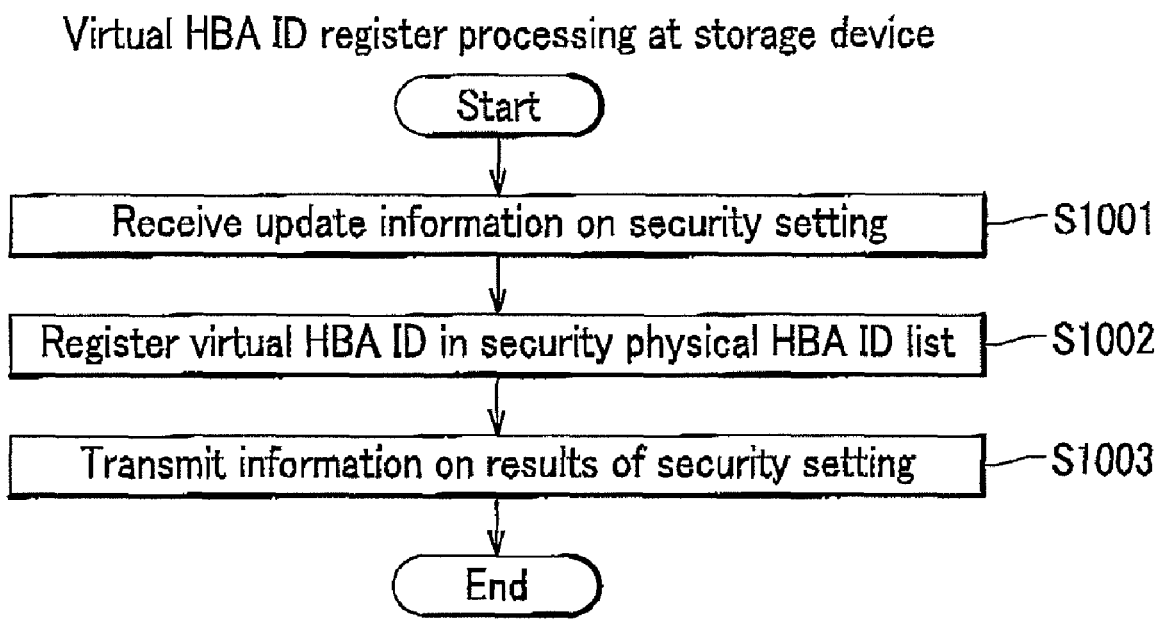
FIG. 35 is a flowchart showing a virtual HBA ID registering processing at a storage apparatus according to the second embodiment.

FIG. 35 is a flowchart showing a virtual HBA ID processing at the storage device 4 according to the second embodiment.

The controller 451 of the storage apparatus 4 receives the update information on the security setting (step S1001). The controller 451 extracts the virtual HBA ID included in the received update information on the security setting and stores the extracted virtual HBA ID, in the security physical HBA ID list in the path setting management table 461 owned by the storage apparatus 4 (step S1002).

The controller 451 transmits information on the results of the security setting including information whether or not the update processing of the security setting has been successfully completed, to the management server 1a (step S1003).

(Real Host Addition Processing at Management Server>

Figure 36:
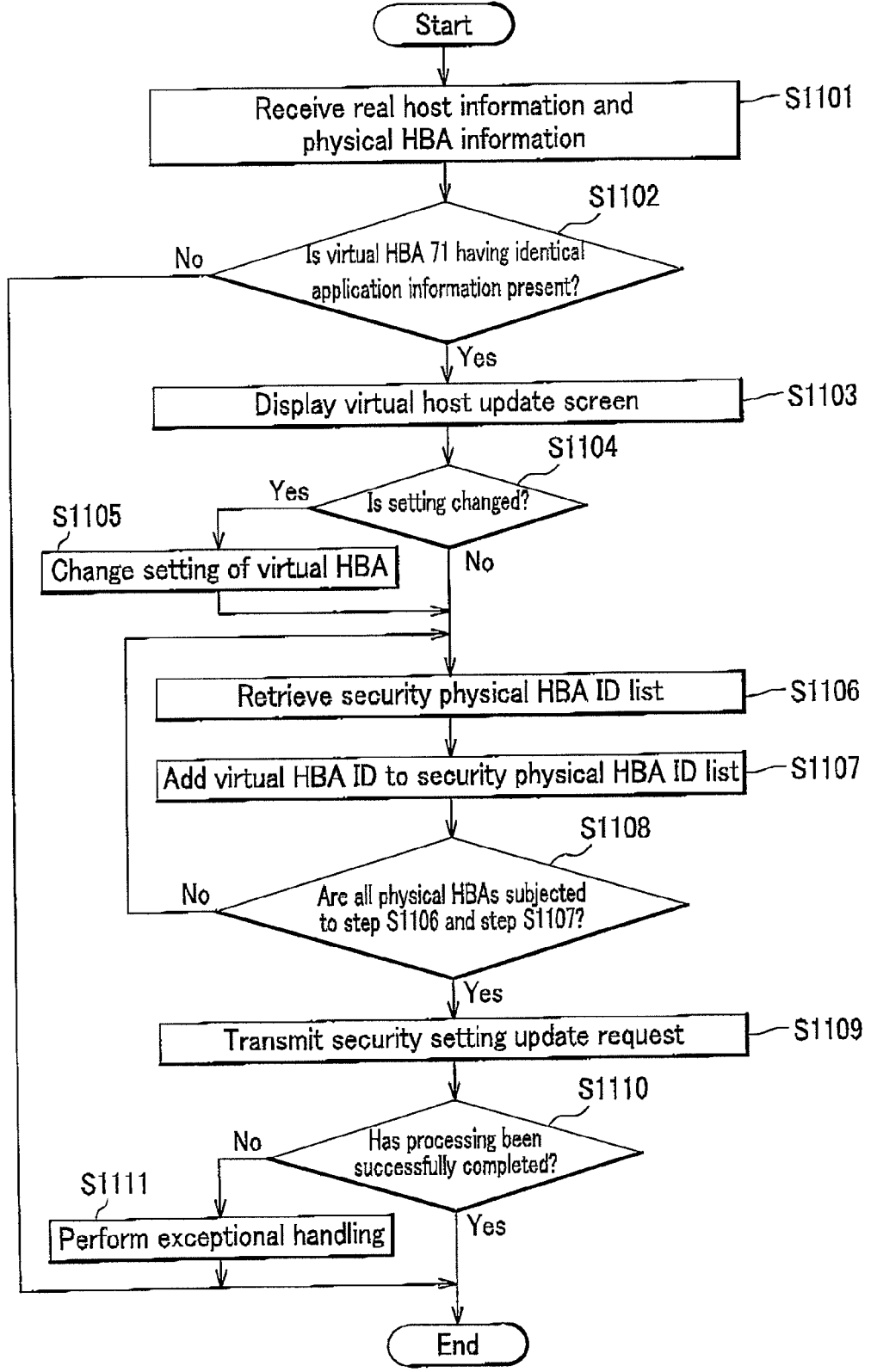
FIG. 36 is a flowchart showing a virtual HBA setting change processing at the management server when a real host is added according to the second embodiment.
Figure 37:
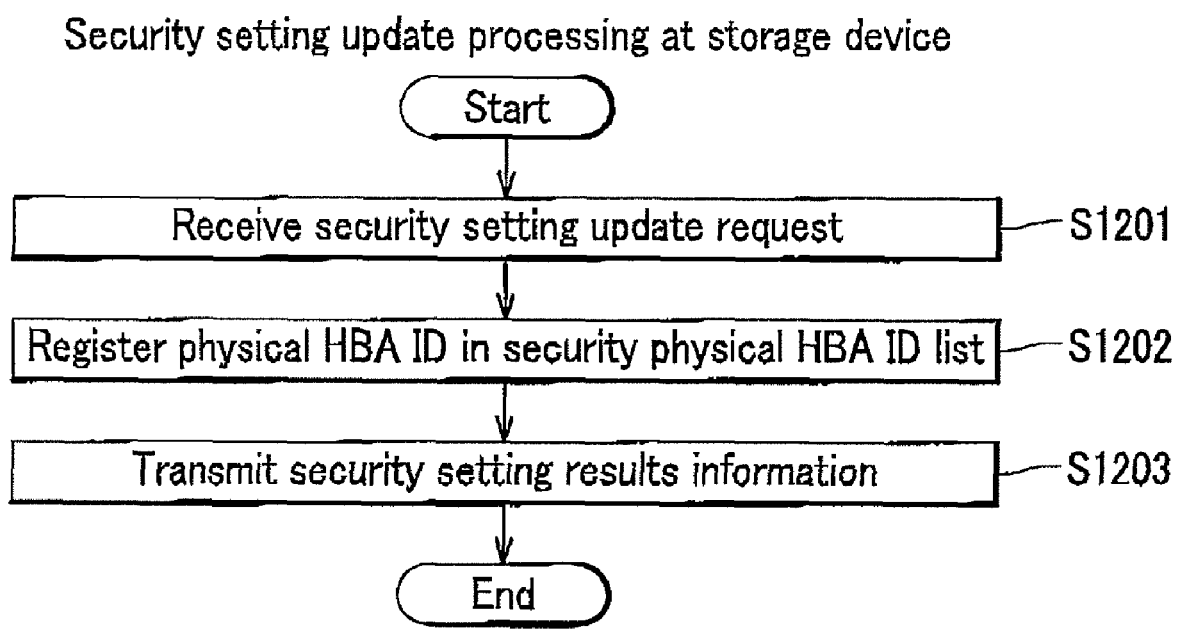
FIG. 37 is a flowchart showing a security setting update processing at the storage apparatus when a real host is added according to the second embodiment.
Figure 38:
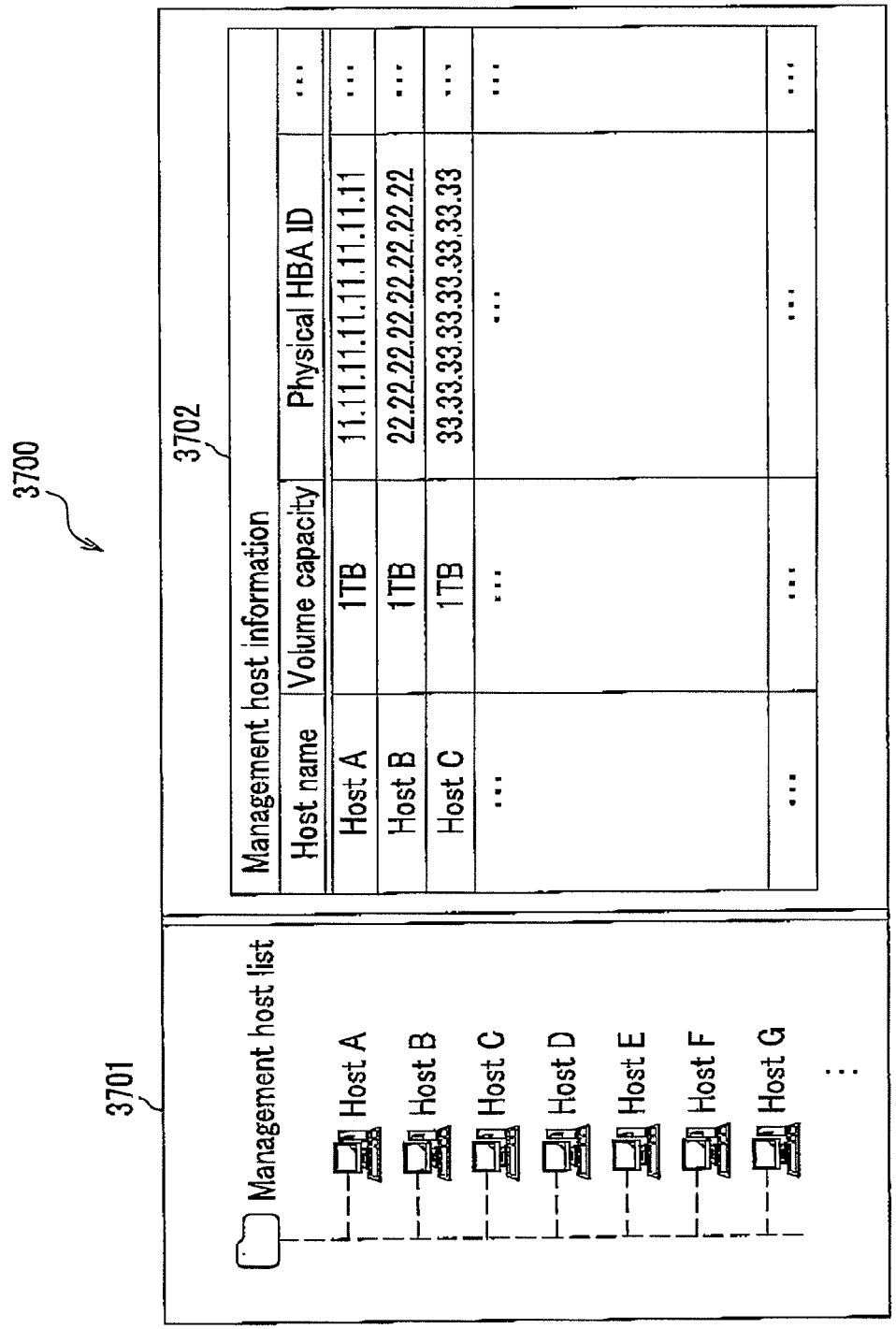
FIG. 38 is a diagram showing an example of a generally-used host management screen according to a comparative example.

FIG. 36 is a flowchart showing a vertical HBA setting change processing at the management server 1a when the real host 2 is added, according to the second embodiment. Processings shown in FIG. 37 and FIG. 38 are performed each time the real host 2 is added. For example, after the processings of FIG. 34 and FIG. 35 are performed upon building the storage system B, if the real host 2 has already been connected to the storage system B, the processings shown in FIG. 36 and FIG. 37 are performed. Then, each time the real host 2 is connected to the storage system B, the processings shown in FIG. 36 and FIG. 37 are performed.

Upon addition of the real host 2, the virtual HBA setting change program 163a receives real host information and physical HBA information thereof from the agent 211 in which the real host 2 is executed (step S1101). The real host information includes a host name and an IP address of the added real host 2, OS information, and application information. The physical HBA information is paired information made up of the host name of the added real host 2 and a physical HBA ID disposed in the real host 2. The virtual HBA setting change program 163a reflects the received real host information and physical HBA information into the real host management table 173 and real host HBA ID management table 174, respectively.

The virtual HBA setting change program 163a retrieves the virtual HBA management table 171a using the application information included in the real host information received in step S1101 as a key. The virtual HBA setting change program 163a thereby determines whether or not the virtual HBA 71 having application information identical to the application information included in the real host information is present (step S1102).

If the virtual HBA 71 having application information identical to the application information included in the real host information is not determined to be present in step S1102 (if "No" in step S1102), the virtual HBA setting change program 163a terminates the processing.

If the virtual HBA 71 having application information identical to the application information included in the real host information is determined to be present in step S1102 (if "Yes" in step S1102), the display processing program 161 makes the display device 14 display the virtual host update screen 1900 shown in FIG. 19 (step S1103).

The virtual HBA setting change program 163a determines whether or not the edit button 1941 or the delete button 1942 on the virtual host update screen 1900 of FIG. 19 is pressed, to thereby determine whether or not the setting is changed (step S1104).

If the setting is not determined to be changed in step S1104 (if "No" in step S1104), the virtual HBA setting change program 163a proceeds the processing to step S1106.

If the setting is determined to be changed in step S1104 (if "Yes" in step S1104), the display processing program 161 makes the display device 14 display the virtual host edit screen 2000 of FIG. 20 or the virtual host delete screen 2100 of FIG. 21 and changes the setting of the virtual HBA according to a user's input thereon (step S1105). The virtual HBA setting change program 163a then proceeds the processing to step S1106. Note that a description of step S1105 is same as that explained above with reference to FIG. 19 to FIG. 21.

Based on the retrieval in step S1102, the virtual HBA setting change program 163a retrieves a virtual HBA ID stored in the security physical HBA ID list in the path setting management table 172, using the virtual HBA ID determined to have the information on the application information identical to the application information included in the real host information (step S1106). The virtual HBA setting change program 163a adds a physical HBA ID to be subjected to the processing, to the security physical HBA ID list (step S1107).

The virtual HBA setting change program 163a determines whether or not all the physical HBAs 23 obtained in step S1101 have already been subjected to step S1106 and step S1107 (step S1108).

If all the physical HBAs 23 are not determined to have been subjected to step S1106 and step S1107 in step S1108 (if "No" in step S1108), the virtual HBA setting change program 163a returns the processing to step S1106.

If all the physical HBAs 23 are determined to have been subjected to step S1106 and step S1107 in step S1108 (if "Yes" in step S1108), the virtual HBA setting change program 163a transmits a security setting update request which includes paired information made up of the virtual HBA ID stored in the security physical HBA ID list in the path setting management table 172 and the physical HBA ID, to the storage apparatus 4 (step S1109).

Upon receiving the update information on the security setting, the storage apparatus 4 performs a processing to be described later with reference to FIG. 37 and transmits information on results of the security setting.

The virtual HBA setting change program 163a determines whether or not the information on the security setting results transmitted from the storage apparatus 4 shows that the processing has been successfully completed (step S1110).

If the processing is determined to have been successfully completed in step S908 (if "Yes" in step S1110), the virtual HBA setting change program 163a terminates the processing.

If the processing is not determined to have been successfully completed in step S908 (if "Not" in step S1110), the virtual HBA setting change program 163a performs exceptional handling such as an error display (step S1111) and terminates the processing.

<Security Setting Update Processing at Storage Device>

FIG. 37 is a flowchart showing a security setting update processing at the storage device 2 when the real host 2 is added, according to the second embodiment.

The controller 451 of the storage apparatus 4 receives the security setting update request (step S1201).

The controller 451 extracts the paired information made up of the virtual HBA ID and physical HBA ID included in the received security setting update request. The controller 451 stores the extracted physical HBA ID in the security physical HBA ID list in the path setting management table 461 owned by the appropriate storage apparatus 4, using the extracted virtual HBA ID as a key (step S1202).

The controller 451 transmits the security setting results information including information whether or not the security processing has been successfully completed, to the management server 1a (step S1203).

<Advantages of Second Embodiment>

In the second embodiment, the virtual HBA 71 (or the virtual host 7) can be set without changing configurations of the real host 2, FC switch 3a, and storage apparatus 4. This enables simple setting and management. Further, in this embodiment, a physical HBA ID can be automatically added to the security physical HBA ID each time the real host 2 is added. This can save a trouble of security setting.

[Comparative Examples]

Figure 39:
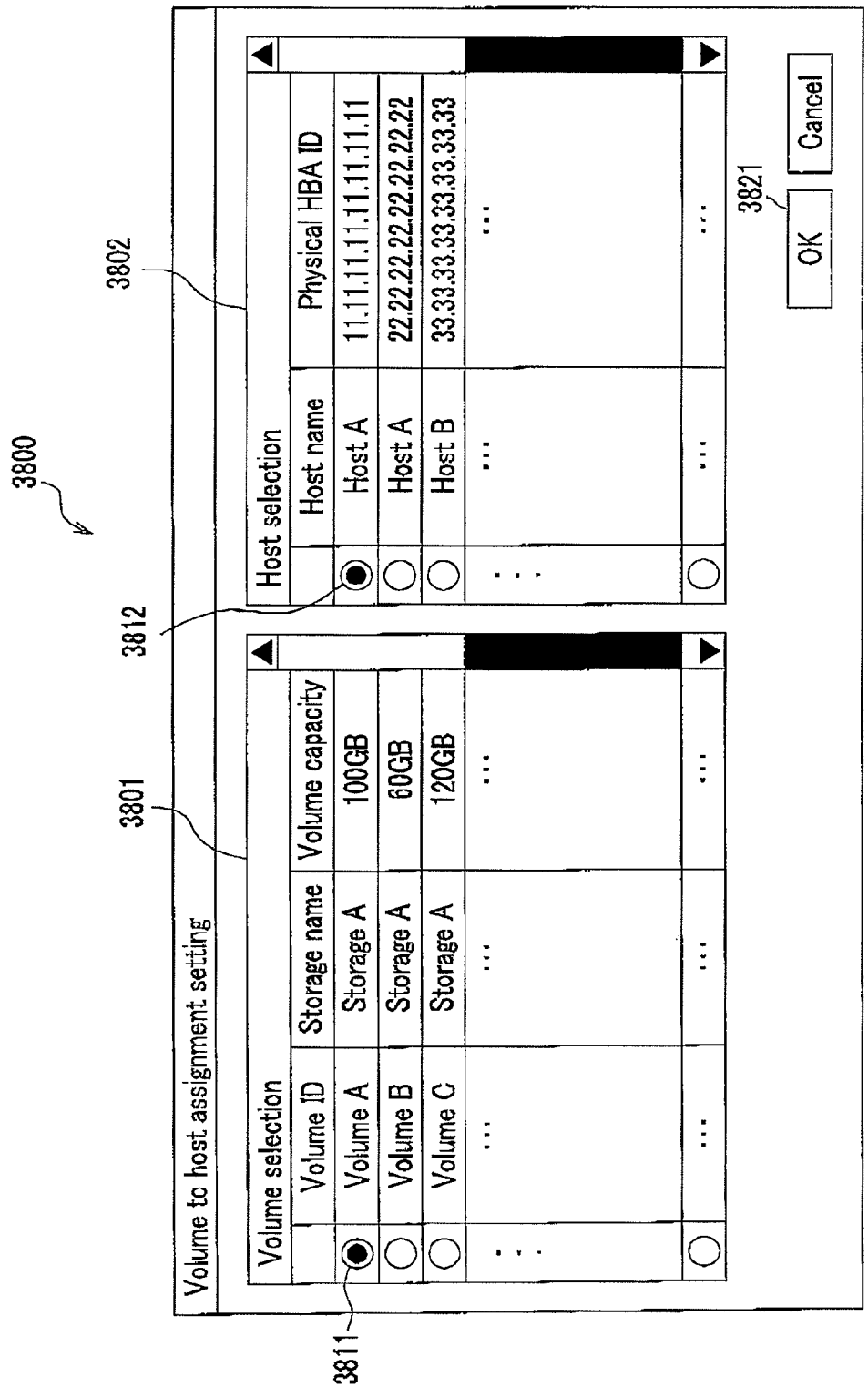
FIG. 39 is a diagram showing an example of a generally-used volume assignment setting screen according to the comparative example.

Next is described a generally-used host management method with reference to FIG. 38 and FIG. 39 using examples of display screens. Note that a host in FIG. 38 or FIG. 39 corresponds to the real host 2 in the first and second embodiments.

FIG. 38 shows an example of a generally-used host management screen according to a comparative example.

A host management screen 3700 includes a host list display area 3701 and a management host summary information display area 3702.

In FIG. 38, the host list display area 3701 displays a management host list. The management host summary information display area 3702 displays a host name, a volume capacity, and a physical HBA ID for each host.

FIG. 39 shows an example of a generally-used volume assignment setting screen according to the comparative example. A volume assignment setting screen 3800 is displayed when, for example, a user sets assignment of a host and a volume.

The volume assignment setting screen 3800 includes a volume selection area 3801 and a host selection area 3802.

The volume selection area 3801 displays information on each volume, and each record has a check button 3811. The host selection area 3802 displays information on the host for each volume, and each record has a check button 3812.

The user selects and presses one of the check buttons 3811 in the volume selection area 3801 and one of the check buttons 3812 in the host selection area 3802. This operation serves as an assignment of the selected volume to the selected host. In FIG. 39, for example, "VolumeA" is assigned to "HostA".

After the setting of volume assignment is completed, the user presses an OK button 3821. This operation displays again the host management screen 3700 of FIG. 38, and the user can confirm the assignment of the volume to the host.

In the comparative example, as shown in FIG. 38 and FIG. 39, a user needs to assign a volume to a host, confirming the assignment having been set so far for each host and volume. Thus, as an environment of the SAN 5 grows larger, a burden of a system administrator as a user increases.

In the first and second embodiments, the virtual HBA 71 is set for each of the same work applications 212, and the real hosts 2 (see FIG. 1 and FIG. 31) using the same work application 212 are grouped into the virtual host 7 and can be managed collectively. Further, since the management servers 1, 1*a* manages a plurality of the real hosts 2 grouped according to types of the work applications 212 into the virtual host(s) 7, a setting of a configuration change is not required when the storage systems A, B are built or the real host 2 is added.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

The invention claimed is:

1. A storage system comprising:
an FC (Fiber Channel) switch communicable with a host computer and a storage apparatus; and
a management server for managing information, the management server being communicable with the FC switch,
the host computer being a virtual host computer for communicating with the FC switch via a virtual interface,
wherein the management server comprises:
a storage part for holding
server virtual interface management information for storing physical interface identifiers which are identifiers of a plurality of physical interfaces of the host computer grouped according to grouping information for grouping the physical interfaces, a virtual interface identifier which is an identifier of the virtual interface, and information on the virtual host computer, which are associated with each other,
host information for storing the virtual interface identifier and information on the host computer, which are associated with each other, and
volume information for storing the virtual interface identifier and a volume of the storage apparatus, which are associated with each other; and
a display processing part for
displaying information on a plurality of the virtual host computers on a display part in a manner in which any part of the information on the virtual host computers is arbitrarily selectable via an input part, and,
upon selection of any part of the information on the virtual host computers via the input part,
obtaining a virtual interface identifier corresponding to the selected part of the information on the virtual host computers, based on the server virtual interface management information of the storage part, obtaining information on a host computer corresponding to the obtained virtual interface information, based on the host information of the storage part, and displaying the obtained information on the host computer, or
obtaining a virtual interface identifier corresponding to the selected part of the information on the virtual host computers, based on the server virtual interface management information of the storage part, obtaining information on a volume corresponding to the obtained virtual interface identifier, based on the volume information of the storage part, and displaying the obtained information on the volume on the display part,
wherein the FC switch comprises an identifier conversion part for storing, when the FC switch transmits or receives data between the originating host computer and the storage apparatus, an originating physical interface identifier included in the data and a virtual interface identifier in association with each other, and for converting the virtual interface identifier included in response data to the data into the originating physical interface identifier.

2. The storage system according to claim 1,
wherein the management server further comprises:
a virtual interface setting part for
obtaining a plurality of physical interface identifiers in the host computer and first grouping information for grouping the physical interface identifiers, from the host computer,
grouping the obtained physical interface identifiers, based on the obtained first grouping information,
assigning the virtual interface identifier and the information on the virtual host computer to the grouped physical interface identifiers,
storing a set of information made up of the virtual interface identifier, the physical interface identifier assigned to the virtual interface identifier, and the information on the virtual host computer, in the server interface identifier management information, and
transmitting paired information made up of the virtual interface identifier and the physical interface identifier assigned to the virtual interface identifier to the FC switch, and
wherein the FC switch further comprises:
a storage part for holding switch virtual interface management information in which the physical interface identifiers and the virtual interface identifier which are associated with each other are stored, and
a setting management part for storing the paired information made up of the virtual interface identifier and the physical interface identifiers assigned to the virtual interface identifier and transmitted from the management server, in the switch virtual interface management.

3. The storage system according to claim 2,
wherein the server virtual-interface management information stores therein the first grouping information which is associated with the virtual interface identifier, wherein the management server further comprises a virtual interface setting change part for
   obtaining, if a host computer is added to the storage system, an additional physical interface identifier which is a physical interface identifier of the physical interface disposed in the added host computer, and second grouping information which indicates to which virtual interface identifier the additional physical interface identifier belongs,
   obtaining the virtual interface identifier associated with the first grouping information which is identical with the obtained second grouping information,
   adding the additional physical interface identifier to the physical interface identifier assigned to the obtained virtual interface identifier, and
   transmitting paired information made up of the virtual interface identifier and the additional physical interface identifier to the FC switch, and
wherein the setting management part of the FC switch further has a function of adding the additional physical interface identifier to the switch virtual interface management information, based on the virtual interface identifier included in the transmitted paired information made up of the virtual interface identifier and the additional physical interface identifier.

4. The storage system according to claim 1,
wherein the display processing part of the management server further has a function of obtaining paired information made up of the virtual interface identifier and the physical interface identifiers which are associated by the server virtual interface management information and a function of displaying the obtained virtual interface identifier and the physical interface identifiers on the display part in a manner in which each of the physical interface identifiers is arbitrarily selectable, and
wherein the management server further comprises a virtual interface setting part for storing, after at least any one of the physical interface identifiers displayed on the display part is selected, the selected physical interface identifier is stored in the server virtual-interface management information, associating the selected physical interface identifier with the virtual interface identifier.

5. The storage system according to claim 1,
wherein the FC switch comprises:
switch virtual interface management information for storing therein the physical interface identifiers and the virtual interface identifier, which are associated with each other;
a storage part for holding, when a data is transmitted or received between the host computer and the storage apparatus, I/O management information in which paired information made up of a converted virtual interface identifier and physical interface identifiers; and
wherein the identifier conversion part is configured for
   obtaining, when a transmission/reception part receives a data transmitted from the host computer to the storage apparatus, the virtual interface identifier associated with the originating physical interface identifier included in the transmitted data, from the switch virtual interface management information,
   converting the originating physical interface identifier into the obtained virtual interface identifier, storing the converted virtual interface identifier and the originating physical interface identifier as paired information, in the I/O management information, and
   converting the virtual interface identifier added to a response data in response to the transmitted data received by the transmission/reception part from the storage apparatus, into the originating physical interface identifier, based on the I/O management information.

6. A storage system comprising:
a host computer;
a storage apparatus;
an FC (Fiber Channel) switch communicable with a host computer and a storage apparatus; and
a management server for managing information, the management server being communicable with the FC switch,
the host computer being a virtual host computer for communicating with the FC switch via a virtual interface,
wherein the management server comprises:
   a storage part for holding
      server virtual interface management information for storing physical interface identifiers which are identifiers of a plurality of physical interfaces of the host computer grouped according to grouping information for grouping the physical interfaces, a virtual interface identifier which is an identifier of the virtual interface, and information on the virtual host computer, which are associated with each other,
      host information for storing the virtual interface identifier and information on the host computer, which are associated with each other, and
      volume information for storing the virtual interface identifier and a volume of the storage apparatus, which are associated with each other; and
   a display processing part for
      displaying information on a plurality of the virtual host computers on a display part in a manner in which any part of the information on the virtual host computers is arbitrarily selectable via an input part, and,
      upon selection of any part of the information on the virtual host computers via the input part,
      obtaining a virtual interface identifier corresponding to the selected part of the information on the virtual host computers, based on the server virtual interface management information of the storage part, obtaining information on a host computer corresponding to the obtained virtual interface information, based on the host information of the storage part, and displaying the obtained information on the host computer, or
      obtaining a virtual interface identifier corresponding to the selected part of the information on the virtual host computers, based on the server virtual interface management information of the storage part, obtaining information on a volume corresponding to the obtained virtual interface identifier, based on the volume information of the storage part, and displaying the obtained information on the volume on the display part,
wherein the FC switch comprises an identifier conversion part for storing, when the FC switch transmits or receives data between the originating host computer and the storage apparatus, an originating physical interface identifier included in the data and a virtual interface identifier in association with each other, and for converting the virtual interface identifier included in response data to the data into the originating physical interface identifier.

7. The storage system according to claim 6,
wherein the management server further comprises:
  a virtual interface setting part for
    obtaining a plurality of physical interface identifiers in the host computer and first grouping information for grouping the physical interface identifiers, from the host computer,
    grouping the obtained physical interface identifiers, based on the obtained first grouping information,
    assigning the virtual interface identifier and the information on the virtual host computer to the grouped physical interface identifiers,
    storing a set of information made up of the virtual interface identifier, the physical interface identifier assigned to the virtual interface identifier, and the information on the virtual host computer, in the server interface identifier management information, and
    transmitting paired information made up of the virtual interface identifier and the physical interface identifier assigned to the virtual interface identifier to the FC switch, and
wherein the FC switch further comprises:
  a storage part for holding switch virtual interface management information in which the physical interface identifiers and the virtual interface identifier which are associated with each other are stored, and
  a setting management part for storing the paired information made up of the virtual interface identifier and the physical interface identifiers assigned to the virtual interface identifier and transmitted from the management server, in the switch virtual interface management.

8. The storage system according to claim 7,
wherein the server virtual-interface management information stores therein the first grouping information which is associated with the virtual interface identifier, wherein the management server further comprises a virtual interface setting change part for
  obtaining, if a host computer is added to the storage system, an additional physical interface identifier which is a physical interface identifier of the physical interface disposed in the added host computer, and second grouping information which indicates to which virtual interface identifier the additional physical interface identifier belongs,
  obtaining the virtual interface identifier associated with the first grouping information which is identical with the obtained second grouping information,
  adding the additional physical interface identifier to the physical interface identifier assigned to the obtained virtual interface identifier, and
  transmitting paired information made up of the virtual interface identifier and the additional physical interface identifier to the FC switch, and
wherein the setting management part of the FC switch further has a function of adding the additional physical interface identifier to the switch virtual interface management information, based on the virtual interface identifier included in the transmitted paired information made up of the virtual interface identifier and the additional physical interface identifier.

9. The storage system according to claim 6,
wherein the display processing part of the management server further has a function of obtaining paired information made up of the virtual interface identifier and the physical interface identifiers which are associated by the server virtual interface management information and a function of displaying the obtained virtual interface identifier and the physical interface identifiers on the display part in a manner in which each of the physical interface identifiers is arbitrarily selectable, and
wherein the management server further comprises a virtual interface setting part for storing, after at least any one of the physical interface identifiers displayed on the display part is selected, the selected physical interface identifier is stored in the server virtual-interface management information, associating the selected physical interface identifier with the virtual interface identifier.

10. The storage system according to claim 6,
wherein the FC switch comprises:
switch virtual interface management information for storing therein the physical interface identifiers and the virtual interface identifier, which are associated with each other;
a storage part for holding, when a data is transmitted or received between the host computer and the storage apparatus,
I/O management information in which paired information made up of a converted virtual interface identifier and physical interface identifiers; and
  wherein the identifier conversion part is configured for
    obtaining, when a transmission/reception part receives a data transmitted from the host computer to the storage apparatus, the virtual interface identifier associated with the originating physical interface identifier included in the transmitted data, from the switch virtual interface management information,
    converting the originating physical interface identifier into the obtained virtual interface identifier, storing the converted virtual interface identifier and the originating physical interface identifier as paired information, in the I/O management information, and
    converting the virtual interface identifier added to a response data in response to the transmitted data received by the transmission/reception part from the storage apparatus, into the originating physical interface identifier, based on the I/O management information.

11. A virtual interface management method performed by a storage system comprising:
a host computer;
a storage apparatus;
an FC (Fiber Channel) switch communicable with a host computer and a storage apparatus; and
a management server for managing information, the management server being communicable with the FC switch,
the host computer being a virtual host computer for communicating with the FC switch via a virtual interface,
wherein the management server
  holds, on a storage part,
    server virtual interface management information for storing physical interface identifiers which are identifiers of a plurality of physical interfaces of the host computer grouped according to grouping information for grouping the physical interfaces, a virtual interface identifier which is an identifier of the virtual interface, and information on the virtual host computer, which are associated with each other, host information for storing the virtual interface identifier and information on the host computer, which are associated with each other, and volume information for storing the virtual interface identifier and a volume of the storage apparatus, which are associated with each other; and displays, on a display processing part, information on a plurality of the virtual host computers on a display part in a manner in which any part of the information on the virtual host computers is arbitrarily selectable via an input part, and, upon selection of any part of the information on the virtual host computers via the input part, obtains a virtual interface identifier corresponding to the selected part of the information on the virtual host computers, based on the server virtual interface management information of the storage part, obtains information on a host computer corresponding to the obtained virtual interface information, based on the host information of the storage part, and displays the obtained information on the host computer, or obtains a virtual interface identifier corresponding to the selected part of the information on the virtual host computers, based on the server virtual interface management information of the storage part, obtains information on a volume corresponding to the obtained virtual interface identifier, based on the volume information of the storage part, and displays the obtained information on the volume on the display part, wherein the FC switch stores when the FC switch transmits or receives data between the originating host computer and the storage apparatus, an originating physical interface identifier included in the data and a virtual interface identifier in association with each other, and converts the virtual interface identifier included in response data to the data into the originating physical interface identifier.

12. The virtual interface management method according to claim 11, wherein the management server obtains a plurality of physical interface identifiers in the host computer and first grouping information for grouping the physical interface identifiers, from the host computer, groups the obtained physical interface identifiers, based on the obtained first grouping information, assigns the virtual interface identifier and the information on the virtual host computer to the grouped physical interface identifiers, stores a set of information made up of the virtual interface identifier, the physical interface identifier assigned to the virtual interface identifier, and the information on the virtual host computer, in the server interface identifier management information, and transmits paired information made up of the virtual interface identifier and the physical interface identifier assigned to the virtual interface identifier to the FC switch, and wherein the FC switch holds switch virtual interface management information in which the physical interface identifiers and the virtual interface identifier which are associated with each other are stored, and stores the paired information made up of the virtual interface identifier and the physical interface identifiers assigned to the virtual interface identifier and transmitted from the management server, in the switch virtual interface management.

13. The virtual interface management method according to claim 12, wherein the server virtual-interface management information stores therein the first grouping information which is associated with the virtual interface identifier, wherein the management server obtains, if a host computer is added to the storage system, an additional physical interface identifier which is a physical interface identifier of the physical interface disposed in the added host computer, and second grouping information which indicates to which virtual interface identifier the additional physical interface identifier belongs, obtains the virtual interface identifier associated with the first grouping information which is identical with the obtained second grouping information, adds the additional physical interface identifier to the physical interface identifier assigned to the obtained virtual interface identifier, and transmits paired information made up of the virtual interface identifier and the additional physical interface identifier to the FC switch, and wherein the FC switch adds the additional physical interface identifier to the switch virtual interface management information, based on the virtual interface identifier included in the transmitted paired information made up of the virtual interface identifier and the additional physical interface identifier.

14. The virtual interface management method according to claim 11, wherein the management server obtains paired information made up of the virtual interface identifier and the physical interface identifiers which are associated by the server virtual interface management information and displays the obtained virtual interface identifier and the physical interface identifiers on the display part in a manner in which each of the physical interface identifiers is arbitrarily selectable, and stores, after at least any one of the physical interface identifiers displayed on the display part is selected, the selected physical interface identifier is stored in the server virtual-interface management information, associating the selected physical interface identifier with the virtual interface identifier.

15. The virtual interface management method according to claim 11, wherein the FC switch holds, in the storage part, switch virtual interface management information for storing therein the physical interface identifiers and the virtual interface identifier, which are associated with each other, and I/O management information in which paired information made up of a converted virtual interface identifier and physical interface identifiers, when a data is transmitted or received between the host computer and the storage apparatus, and wherein the FC switch obtains, when a transmission/reception part receives a data transmitted from the host computer to the storage apparatus, the virtual interface identifier associated with the originating physical interface identifier included in the transmitted data, from the switch virtual interface management information, converts the originating physical interface identifier into the obtained virtual interface identifier, stores the converted virtual interface identifier and the originating physical interface identifier as paired information, in the I/O management information, and
converts the virtual interface identifier added to a response data in response to the transmitted data received by the transmission/reception part from the storage apparatus, into the originating physical interface identifier, based on the I/O management information.

* * * * *